(12) United States Patent
Hilgers

(10) Patent No.: US 10,717,877 B2
(45) Date of Patent: Jul. 21, 2020

(54) PHOTOCURABLE COATING COMPOSITION AND ITS USE

(71) Applicant: Momentive Performance Materials GmbH, Leverkusen (DE)

(72) Inventor: Christoph Hilgers, Pulheim (DE)

(73) Assignee: Momentive Performance Materials GMBH, Leverkusen (DE)

(*) Notice: Subject to any disclaimer, the term of this patent is extended or adjusted under 35 U.S.C. 154(b) by 92 days.

(21) Appl. No.: 14/899,619

(22) PCT Filed: Jun. 26, 2014

(86) PCT No.: PCT/EP2014/063513
§ 371 (c)(1),
(2) Date: Dec. 18, 2015

(87) PCT Pub. No.: WO2014/207103
PCT Pub. Date: Dec. 31, 2014

(65) Prior Publication Data
US 2016/0145449 A1    May 26, 2016

(30) Foreign Application Priority Data

Jun. 26, 2013 (EP) ..................... 13173735

(51) Int. Cl.
*C09D 5/00* (2006.01)
*C09D 4/06* (2006.01)
(Continued)

(52) U.S. Cl.
CPC ............. *C09D 5/00* (2013.01); *B05D 1/26* (2013.01); *B05D 3/067* (2013.01); *B05D 5/02* (2013.01); *B41J 2/01* (2013.01); *C08J 3/28* (2013.01); *C09D 4/00* (2013.01); *C09D 4/06* (2013.01); *C09D 7/42* (2018.01); *C09D 11/38* (2013.01);
(Continued)

(58) Field of Classification Search
CPC .......... B05D 3/067; B05D 3/062; B05D 5/02; C09D 4/06; C09D 7/42; C09D 133/04; C08J 3/28
See application file for complete search history.

(56) References Cited

U.S. PATENT DOCUMENTS 3,211,795 A    10/1965   Edwards et al.
3,759,807 A    9/1973    Osborn et al.
(Continued)

FOREIGN PATENT DOCUMENTS

DE    10 2011 014 104 B3    6/2012
EP          0 824 119 A2    2/1998
(Continued)

OTHER PUBLICATIONS

International Search Report for corresponding International Application No. PCT/US2014/032334 dated Jul. 10, 2014.
(Continued)

*Primary Examiner* — Kregg T Brooks
(74) *Attorney, Agent, or Firm* — Renner, Otto, Boisselle & Sklar, LLP

(57) ABSTRACT

The invention relates to a photocurable coating composition, a coating process using said composition, and coated articles comprising the cured composition. The coated articles are weather and scratch resistant.

7 Claims, 4 Drawing Sheets

(51) Int. Cl.

| | | |
|---|---|---|
| *C09D 7/42* | (2018.01) | |
| *B05D 5/02* | (2006.01) | |
| *C08J 3/28* | (2006.01) | |
| *C09D 11/38* | (2014.01) | |
| *C09D 133/04* | (2006.01) | |
| *C09D 4/00* | (2006.01) | |
| *B41J 2/01* | (2006.01) | |
| *B05D 1/26* | (2006.01) | |
| *B05D 3/06* | (2006.01) | |
| *C08F 222/10* | (2006.01) | |
| *C08F 220/18* | (2006.01) | |

(52) U.S. Cl.
CPC .......... *C09D 133/04* (2013.01); *C08F 220/18* (2013.01); *C08F 222/1006* (2013.01)

(56) References Cited

U.S. PATENT DOCUMENTS

| | | | |
|---|---|---|---|
| 4,027,073 A | 5/1977 | Clark | |
| 4,278,804 A | 7/1981 | Ashby et al. | |
| 4,299,746 A | 11/1981 | Frye | |
| 4,308,317 A | 12/1981 | Olson et al. | |
| 4,374,674 A | 2/1983 | Ashby et al. | |
| 4,419,405 A | 12/1983 | Ashby et al. | |
| 4,451,634 A | 5/1984 | Hatanaka et al. | |
| 4,495,360 A | 1/1985 | Anthony | |
| 4,525,426 A | 6/1985 | Anthony | |
| 4,544,582 A * | 10/1985 | Benjamin | C09D 133/06 427/164 |
| 4,558,147 A | 12/1985 | Eckberg et al. | |
| 4,680,232 A | 7/1987 | Factor et al. | |
| 4,885,332 A * | 12/1989 | Bilkadi | C08J 7/047 252/182.17 |
| 4,914,143 A * | 4/1990 | Patel | C09D 4/00 522/148 |
| 5,074,897 A | 12/1991 | Sikich | |
| 5,391,795 A | 2/1995 | Pickett | |
| 5,407,666 A * | 4/1995 | Patel | A61K 8/8152 424/61 |
| 5,468,789 A | 11/1995 | Lewis et al. | |
| 5,516,509 A * | 5/1996 | Marr-Leisy | A61K 8/35 424/61 |
| 2002/0086914 A1 | 7/2002 | Lee et al. | |
| 2011/0318567 A1 | 12/2011 | Hildenbrand et al. | |
| 2012/0141778 A1* | 6/2012 | Phipps | C09D 15/00 428/325 |

FOREIGN PATENT DOCUMENTS

| | | |
|---|---|---|
| EP | 1 381 519 B1 | 11/2004 |
| EP | 1 743 909 A1 | 1/2007 |
| EP | 1 404 527 B1 | 3/2009 |
| JP | H07-286115 A | 10/1995 |
| JP | 2011-201930 A | 10/2011 |
| JP | 2012-081742 A | 4/2012 |
| JP | 2012-517513 A | 8/2012 |
| WO | 2002/038688 A2 | 5/2002 |
| WO | 2008/109252 A1 | 9/2008 |
| WO | 2009/121337 A2 | 10/2009 |

OTHER PUBLICATIONS

Othmer Encyclopedia of Chemical Technology, vol. 19, Interscience Publishers, New York, 1969, pp. 507-593.
Encyclopedia of Polymer Science and Technology, vol. 13, Interscience Publishers, New York, 1970, pp. 477-486.
International Preliminary Report on Patentability for corresponding International Application No. PCT/EP2014/063513 dated Dec. 29, 2015.

* cited by examiner

Zetasizer result for the FCS100 composition comprising b), c) and a) diluted 1 : 100 in isopropanol

Figure 3a and 3b: Surfaces with higher and lower gloss:
Figure 3a: Cured composition on a polycarbonate sheet without matting additive (f2) showing high gloss:
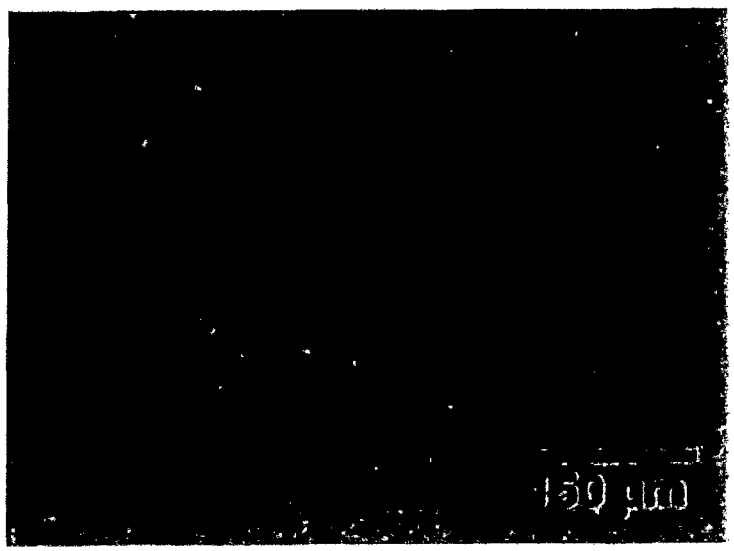
Figure 3b: Cured composition on a polycarbonate sheet <u>with</u> the matting additive (f2) showing low gloss. The domains in the micro-folded surface structure have diameters of 20-80 μm

PHOTOCURABLE COATING COMPOSITION AND ITS USE

This application is a national phase of International Application No. PCT/EP2014/063513 filed Jun. 26, 2014 and published in the English language, and claims priority to Application No. EP 13173735.5 filed Jun. 26, 2013.

The invention relates to a photocurable coating composition which is advantageously applicable in a spray-coating process, in particular in an ink-jet coating process. With the photocurable coating composition, coated or printed décor surfaces can be over-coated with a transparent, clear, weather- and scratch resistant topcoat. In a preferred process this topcoat is applied by a digital printing process wherein the photocurable composition is applied through ink-jet nozzles and the film on the substrate is subjected to a curing process by irradiation through light, in particular UV light.

Technical Problem

Coating processes with scratch resistant light curable for example acrylate compositions are known in the art. Such coatings usually have a high gloss. For some applications in the technical field of coatings it is desirable to provide scratch resistant light curable coatings with lower gloss levels. It is further desirable to apply these coating compositions not only with the usual coating processes such as spray-, dip, flow- or roller-coating but also in particular with digital printing methods.

UV-lacquers with a low gloss level comprising common matting agents cannot be applied simply with ink-jet heads or nozzles, as these matting agents having average particle sizes which cannot pass jet nozzles in printing heads. Particles of typical matting agents selected from silicas, silsesquioxanes such as Tospearl® microspheres (Momentive), ZnO and the like or other inorganic or organic particles such as polyolefinic materials (waxes) would physically block the jet nozzles in printing heads after a certain time. Typical nozzle diameters of printing heads are between 10-40 µm. Typical sizes of matting agents are in the range of >0.5-20 µm ($D_{50}$: average (diameter) particle size). In order to avoid conflicts with nozzle build-up caused by fillers one can apply nozzles having a greater diameter. As a consequence these nozzles create bigger droplets which then create for example images of lower resolution.

Accordingly there has been a need to provide a photocurable coating composition having a matt surface, which coating composition is in particular suitable to be processed through a spray nozzle equipment in particular an ink-jet equipment.

STATE OF THE ART

EP 1381519 A1 discloses primed substrates upon which radiation curable colored ink compositions are applied by ink-jetting and methods of an ink-jet printing process which makes use of radiation curable inks jetted onto a primer layer which is applied onto the substrate prior to ink-jetting. Focus is the adhesion optimization between ink and primer.

U.S. Pat. No. 7,423,072 B2 (US 2002-0086914 A1 or EP 1355999 A2) discloses light curable acryl compositions with or without coloration by pigments for outdoor substrates. The disclosed compositions of acrylates are sprayed (jetted) through a nozzle of an ink-jet print head. The inventors of that patent observed severe nozzle build-up in some examples.

EP 1404527 A1 teaches to apply a curable ink onto a primed substrate whereby the difference of the solubility parameters between the primer polymer and the ink monomers is claimed in order to improve the print quality. The primer and ink compositions can contain 0.1-10% by weight of silicas among other additives fumed silicas as filler.

None of the above mentioned patents describe the generation of low gloss levels in the finally cured coating to generate a matt surface with a gloss of <50 measured at 60° according to ASTM D 523 in conjunction with an ink-jet process. In the disclosure of U.S. Pat. No. 7,423,072 B2 high gloss coatings are mentioned having gloss levels of >70 at 60° according to ASTM D 523. As monomers N-Vinylpyrrolidon and N-Vinyl-caprolactam were selected to keep a high gloss level on the cured ink-jetted coatings.

OBJECT OF THE INVENTION

The object underlying the present invention was to provide a photocurable coating composition having a matt surface, which coating composition is in particular suitable to be processed by a spray coating process, in particular, through a spray nozzle equipment preferably an ink-jet equipment. Furthermore the coating obtained should provide a translucent, colorless matt surface which is weather- and scratch resistant

SUMMARY OF THE INVENTION

The inventors surprisingly found that selected scratch resistant photocurable coating compositions can be furnished with matting agents without loss of the favorable resistance against abrasion and degradation through UV-light having a reasonably low viscosity of the coating composition of for example 1-50 m Pas at 50° C. and 1-400 mPas at 25° C. respectively, measured according to ISO 12058.

Such photocurable coating compositions can be applied with a conventional ink-jet head, for example a piezoelectric print head.

BRIEF DESCRIPTION OF THE DRAWINGS

FIG. 3a is a TEM micrograph of a cured composition on a polycarbonate sheet without a matting additive.

FIG. 3b is a TEM micrograph of a cured composition on a polycarbonate sheet with a matting additive.

DETAILED DESCRIPTION

Figure 1:
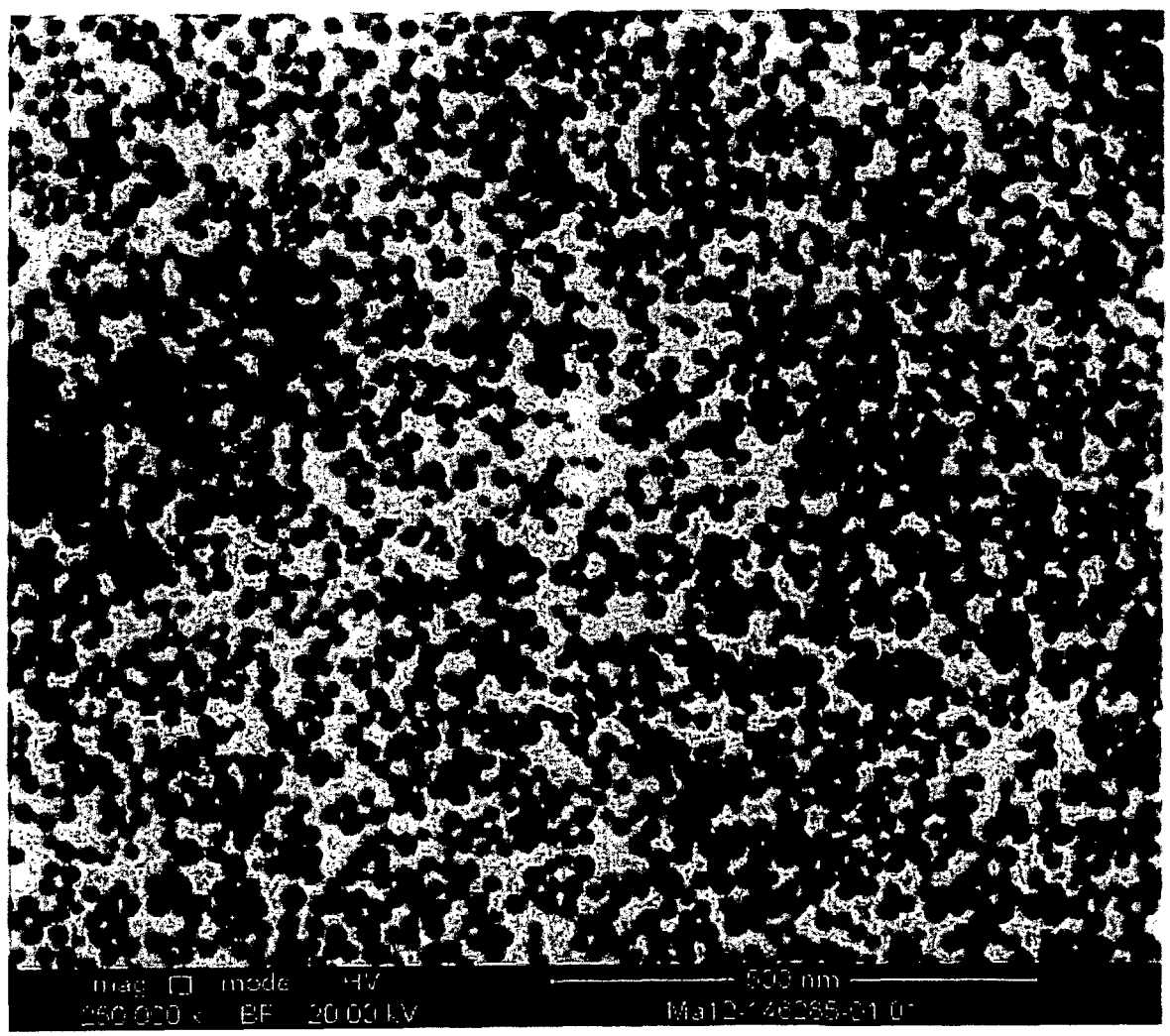
FIGS. 1a and 1b show the TEM micrographs of a dispersion of the filler component (colloidal silica b)) at two different magnifications (1:250000 and 1:500000).

Accordingly, in accordance with the present invention there is provided a photocurable coating composition comprising:
  a) at least one photocurable component,
  b) at least one filler having an average diameter particle size of $D_{50}$<0.5 µm,
  c) optionally one or more silanes or siloxanes, preferably one or more alkoxysilanes,
  d) at least one UV light stabilizer, e) at least one photoinitiator,
f) at least one component selected from the group consisting of particulate non-swellable fillers f1) having an average particle size of $D_{50}>0.5$ µm and a swellable or soluble polymers f2),
g) optionally one or more solvents, and
h) optionally one or more auxiliaries.

The Photocurable Component a)

In a preferred embodiment the photocurable component a) comprises at least one acrylate-functional compound having one or more functional acrylate groups (including here and in the entire application acrylate and methacrylate groups).

The photocurable component a) is preferably selected from acrylate-functional monomers, oligomers or polymers, having one or more functional acrylate or methacrylate groups. Monomers in this context are conventional functional acrylate compounds which have not been subject of an oligomerisation or polymerisation step, such as (meth) acrylic esters during their preparation.

Representative examples of such acrylates include polyfunctional acrylates compounds possessing acrylic, methacrylic, ethacrylic groups and the like, having preferably a functionality equal to or greater than two.

Preferably the photocurable component a) comprises at least two acrylate components selected from at least one acrylate having an acrylate functionality of 2 to 4, preferably 2, and at least one acrylate having an acrylate functionality of ≥5, preferably 6.

In a further preferred embodiment the photocurable component a) comprise urethane acrylates, that is chemical compounds having urethane groups and acrylate groups.

In a still further preferred embodiment the photocurable component a) comprises at least one, preferably at least two urethane acrylates, each having at least two functional acrylate groups, in particular from 2 to 6 functional acrylate groups.

In a particularly preferred embodiment the photocurable component a) comprises at least one urethane acrylate having two functional acrylate groups (briefly urethane diacrylate) and at least one urethane acrylate having six functional acrylate groups (briefly urethane hexaacrylate). Such urethane acrylates are commercially available for example under the trademarks Ebecryl™ (Cytec Specialty Chemicals), Sartomer® (Arkema Group), Desmolux® (Bayer Material Science), Miramer® (Miwon Company) or Etercure® (Eternal Company).

Preferably, the acrylates are selected from the group consisting of hexafunctional or higher functional aliphatic acrlyates and urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated or propoxylated trimethylolpropane triacrylate, butanediol diacrylate, tripropylene glycol diacrylate, trimethylolpropane trimethacrylate, aliphatic difunctional urethane acrylates, tetraacrylate monomer, aliphatic polyester acrylate oligomers including hyperbranched oligomers, and acrylates mentioned in the subsequent paragraph, and combinations thereof.

In a further particular preferred embodiment the photocurable component a) preferably in addition to the urethane acrylates comprises at least one polyfunctional acrylate compound that does not comprise urethane functional groups, like those based on polyfunctional alcohols such as polyester acrylate oligomers, 1,4-butanediol diacrylate, 1,6-hexanediol diacrylate, tris(2-hydroxyethyl) isocyanurate triacrylate, 1,8-octanediol diacrylate, 1,10-decanediol diacrylate, 3-methyl-1,5-pentanediol diacrylate, and aliphatic polyester polyacrylates.

The acrylate functional compounds have moieties which are activatable by radicals and can undergo radically initiated crosslinking reaction. Radical initiation of the crosslinking reaction is preferably induced by UV-irradiation.

The preferred acrylate compounds a) have a number average molecular weight of up to 6000 gram/mole (measured by GPC with polystyrene as standard). Particularly suitable acrylates have molecular weights of 150-5000 grams/mole (measured by GPC with polystyrene as standard).

A preferred group of acrylates are the aliphatic urethane (meth)acrylates having 3 or more functional groups, which preferably includes an aliphatic urethane (meth)-acrylate having 5 or more functional groups. If the number of functional groups is 6 or greater, the weather resistance of the coating films is excellent and also the crosslinking density increases leading to excellent abrasion resistance.

Examples of this type of aliphatic urethane (meth)acrylate include reaction products of a polyisocyanate compound, a polyol and a (meth)acrylate having a hydroxyl group. Examples of the polyisocyanate compound include hexamethylene diisocyanate and oligomers thereof, 2,2,4-trimethylhexamethylene diisocyanate, hexamethylene diisocyanate trimer, like HDI-Isocyanurat(Trimer), cycloaliphatic diisocyanates such as isophoronediisocyanate and oligomers thereof, like trimers (Desmodur Z4470) and aliphatic polyisocyanates. Particularly preferred are alicyclic polyisocyanates, like those based on isophorone diisocyanate.

Particularly preferred are reaction products of pentaerythritol triacrylate with isophorone diisocyanate. Also preferred is tricyclodecanedimethanoldiacrylate, a bifunctional monomer manufactured by Nippon Kayaku Co., Ltd.

The urethane building units are in particular the reaction products of said isocyanates and a polyol component. Suitable polyols include ethylene glycol, diethylene glycol, propylene glycol, dipropylene glycol, 1,6-hexanediol, neopentyl glycol, trimethylolpropane and pentaerythritol. Other polyol components comprise acrylic units such as (meth) acrylates having a hydroxyl group including pentaerythritol tri(meth)acrylate, dipentaerythritol penta(meth)acrylate and dipentaerythritol tri(meth)acrylate and the like. By reacting the aforementioned polyisocyanate compound, the polyol and the (meth)acrylate having a hydroxyl group, a hexafunctional or higher aliphatic urethane (meth)acrylate is obtained. A conventional catalyst for this reaction may be used. Commercially available cycloaliphatic urethane (meth)acrylates include for example "EBECRYL 1290".

Examples of acrylate compounds suitable for this invention are commercially available, like for example:

| Trade name | Chemical Composition | Manufacturer |
| --- | --- | --- |
| CN981 | Difunctional urethane acrylate | Sartomer Company |
| CN983 | Difunctional urethane acrylate | Sartomer Company |
| CN991 | Difunctional urethane acrylate | Sartomer Company |
| CN9001 | Hexafunctional Urethane Acrylate | Sartomer Company |
| CN9012 | Difunctional urethane acrylate | Sartomer Company |
| CN9200 | Difunctional urethane acrylate | Sartomer Company |

-continued

| Trade name | Chemical Composition | Manufacturer |
| --- | --- | --- |
| CN996 | Difunctional urethane acrylate | Sartomer Company |
| CN595 | 1,10 Decanediol Diacrylate | Sartomer Company |
| Desmolux U400 | Hexafunctional Urethane Acrylate | Sartomer Company |
| Ebecryl 1290 | Hexafunctional Urethane Acrylate | Cytec Specialty Chemicals |
| Ebecryl 8301 | Hexafunctional Urethane Acrylate | Cytec Specialty Chemicals |
| Ebecryl 140 | Tetraacrylate monomer | Cytec Specialty Chemicals |
| Ebecryl 1140 | Polyester acrylate oligomer | Cytec Specialty Chemicals |
| Etercure 6145 | Hexafunctional Urethane Acrylate | Eternal Company |
| Miramer PU 610 | Hexafunctional Urethane Acrylate | Miwon Company |
| SR399 | Dipentaerythritol pentaacrylate | Sartomer Comapny |
| SR213 | 1,4-butanediol diacrylate | Sartomer Company |
| SR355 | Di-trimethylolpropane tetraacrylate | Sartomer Company |
| SR494 | Ethoxylated Pentaerythritol Tetraacrylate | Sartomer Company |
| SR454 | Ethoxylated trimethylolpropane Triacrylate | Sartomer Company |
| EM 235 | Pentaerythritoltriacrylate | Eternal Company |
| SR341 | 3-Methyl-1,5-Pentanediol Diacrylate | Sartomer Company |
| SR350 | Trimethylolpropane trimethacrylate | Sartomer Company |
| SR606 A | Esterdiol diacrylate | Sartomer Company |
| TPGDA | Tripropylene glycol diacrylate | Cytec Specialty Chemicals |
| TMPTA[1)] | Trimethylolpropane triacrylate | Cytec Specialty Chemicals |
| HDDA [2)] | Hexanediol diacrylate | Cytec Specialty Chemicals |

[1)] also Eternal EM 231, SR 351 Sartomer
[2)] also SR 238 Sartomer and mixtures thereof.

A particular preferred photocurable component a) comprises the following 4 types of acrylates: I) multifunfunctional acrylates, II) triacrylates, (optional) III) diacrylates and (optional) IV) aliphatic urethane acrylates.

The preferred weight ratios of the acrylate components in the photocurable coating composition are for
I) Hexaacrylates/multifunctional acrylates (f≥5): 8-48 weight parts,
II) Triacrylates: 10-33 wt.pt.,
III) Aliphatic diacrylates:0-24 wt.pt., and
IV) Aliphatic urethane diacrylate: 0-33 wt.pt.

The preferred acrylates in groups I) to IV) are:
I) hexafunctional aliphatic urethane acrylates or aliphatic multifunctional acrylates (f≥6) like Ebecryl 1290, 1290K, 8301,8301R (Cytec Specialty Chemicals), Etercure 6145-100,6147,6161-100,6150-100 (Eternal), PU 610 (Miwon), Desmolux U400 (Bayer Material Science), CN9010EU (Sartomer), Genocure 4690 (Rahn); MU 9800 (Miwon), Etercure 6195-100 (Eternal)
II) aliphatic triacrylates with a dynamic viscosity<1200 mPa·s (25° C.) like pentaerythritol triacrylate, ethoxylated trimethylolpropane triacrylate, propoxylated trimethylolpropane triacrylate, trimethylolpropane triacrylate
III) aliphatic diacrylates with a molecular weight<350 g/mol and a viscosity of <40 mPa·s (25° C.), for example SR606A (Sartomer), SR 341 (Sartomer), CN 595 (Sartomer), HDDA and TPGDA (Cytec Specialty Chemicals), 1,4-butanediol diacrylate (SR 213, Sartomer),
IV) Aliphatic urethane diacrylates with molecular weight Mn<4000 g/mol (measured with GPC) such as CN 965, CN 981, CN 983, CN991, CN 996 of Sartomer (Arkema group).

The amount of the photocurable component a) in the photocurable coating composition of the present invention preferably is 10 to 90 wt. % more preferably 15 to 85 wt. % still more preferably 20 to 80 weight percent, based on the solid content the photocurable composition, that is all components except solvents.

The photocurable component a) is different from the silane or siloxane components c), which as will be explained below, may also comprise photocurable acrylate groups, because the photocurable component a) generally does not have any silane or siloxane groups, and are preferably silicone-free.

Component b)

Component b) is at least one filler having an average diameter particle size of $D_{50}$<0.5 μm. It is selected from at least one preferably inorganic filler having a average (diameter) particle size of $D_{50}$<0.5 μm, preferably 2 to 100 nm, still more preferably 5 to 50 nm. The purpose of this kind of filler is in particular to increase the scratch resistance of the cured coating film. The particle size of these fillers is small enough not to substantially scatter visible light and substantially these fillers do not form aggregates. Such fillers do not increase the viscosity of the coating compositions to an high unacceptable level.

The fillers b) include in particular oxides, acids and/or hydroxides of the metals selected from Al, Ce, Hf, La, Si, Sn, Ti, Zn and Zr, the preferably element is Si. The particles have an average particle size of $D_{50}$<0.5 μm, preferably <0.4 μm, more preferably <0.3 μm still preferably <0.2 μm.

The average particle size $D_{50}$ is, in particular, determined by laser 'Dynamic Light Scattering with a Malvern Zetasizer which also known as photon correlation spectroscopy or quasi-elastic light scattering following ISO 13320-1 (see also http://en.wikipedia.org/wiki/Dynamic light_scattering). Although this method is the determination method of choice, in particular in the non-cured coating composition, in certain instances it is also sufficient to determine the average particle size $D_{50}$ by electron microscopy (TEM). Such method can be applied in particular at the cured coating film. In particular, the particles can be evaluated in the related TEM (Transmission Electron-Microscope) photos and the average size value for a chosen collection of particles can be calculated with a software program according to ISO13322-1.

Figure 1B:
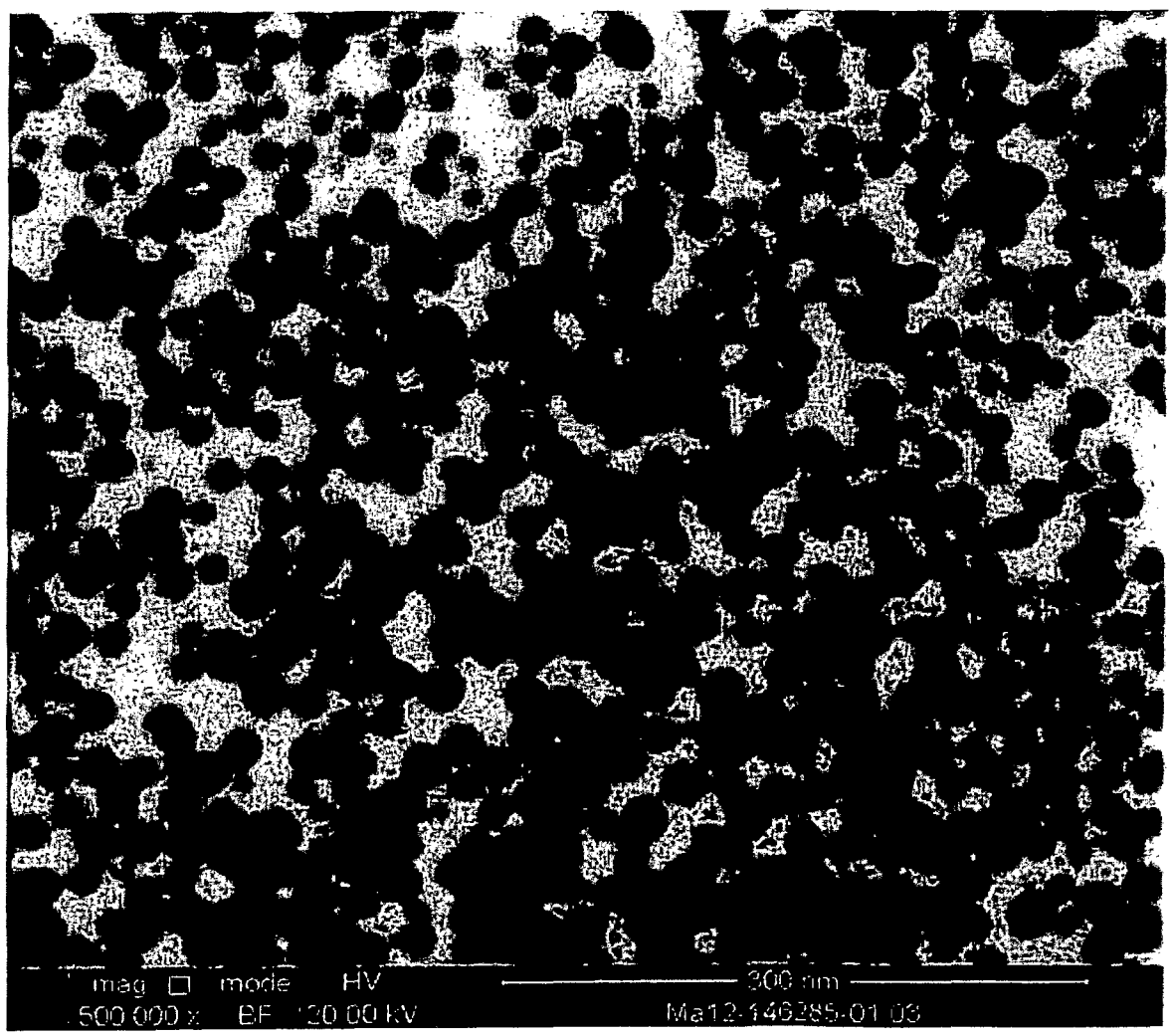

FIGS. 1a and 1b show the TEM micrographs of a dispersion of the filler component (colloidal silica b)) at two different magnifications (1:250000 and 1:500000). Particle sizes are significantly below 500 nm.

Figure 2:
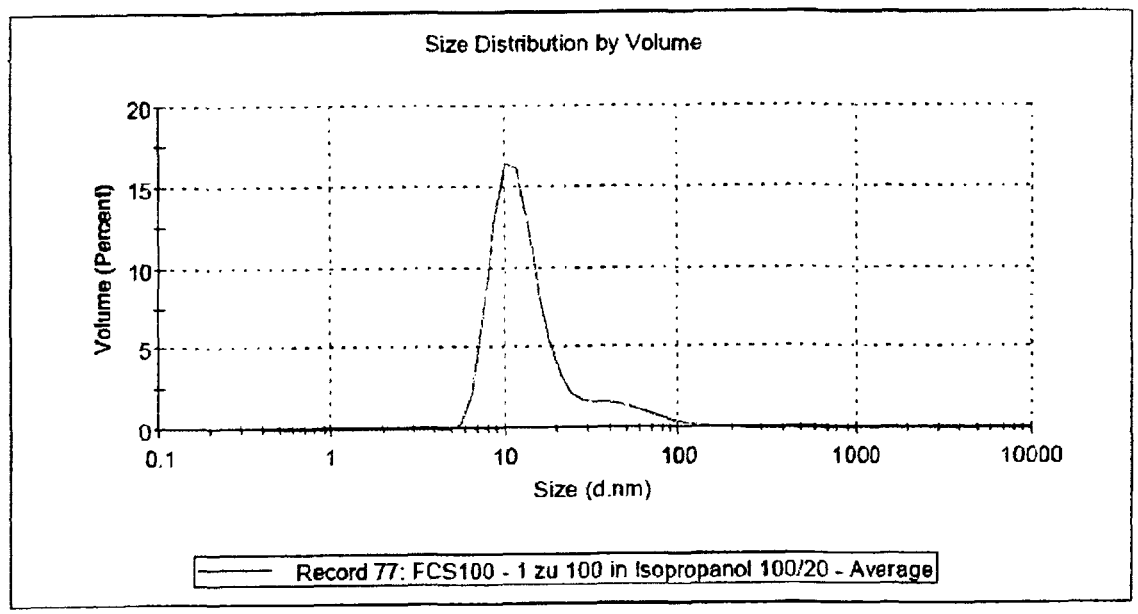
FIG. 2 shows the size distribution by volume for a composition (FCS100) containing colloidal silica treated with methacryloxypropyltrimethoxysilane in hexanedioldiacrylate, diluted with isopropanol in a weight ratio of 1 part FCS100 to 100 parts isopropanol.

In FIG. 2 the filler component b) measured was a dispersion of colloidal silica named FCS100 which is 50 wt.-% solid of colloidal silica treated with methacryloxypropyltrimethoxysilane in hexanedioldiacrylate, diluted with isopropanol in a weight ratio of 1 part FCS100 to 100 parts isopropanol.

Possible fillers according to component b) are preferably selected from the group of those types of fillers which keep the viscosity of the total composition at a reasonable low level, in particular <500 mPa·s, preferably 1-400 mPa·s measured at 25° C. according to ISO 12058. Furthermore this type of filler should retain the viscosity relatively constant constant that is provide a sufficient shelf life time at 25° C., that is, gelation should not occur within a period of minimum 360 days after preparation of the coating composition. In addition the filler component b) should be suitable to improve the abrasion or scratch resistance and should provide a sufficient transparency of the cured coating composition. These requirements can best be fulfilled by fillers having more or less spherical shaped particles having average particle sizes $D_{50}$ in the range of 0.005 to 0.25 μm (5-250 nm) and a low tendency to form aggregates in particular under condensation of reactive hydroxyl groups such as AlOH, TiOH, ZrOH, SiOH and the like. It is therefore preferred to use oxidic fillers selected from the group of Al, Ce Ti, Zr and Si, most preferably Si. Such oxidic fillers are prepared in particular by sol gel technology as colloidal dispersions and these colloidal dispersions are preferably stabilized by treating the surface of the particles. The preferred colloidal materials are colloidal silicas, which are preferably used dispersed in organic solvents, such as alcohols and also the photocurable component a). Colloidal silicas include a wide variety of finely divided $SiO_2$ particles which can be utilized to improve the properties of the coating compositions of the present invention. Further description can be found in U.S. Pat. No. 4,027,073.

The preferred colloidal silicas are available under the brandnames such as "Ludox" made by Grace Company "Nalco" made by Nalco Chemical Company, "Levasil or Bindzil" made by Akzo Nobel or "ORGANOSILICASOL" made by Nissan Chemical. Examples of preferred colloidal silicas for use in the composition of the invention include in particular Nalco® 1034A, Nalco® 1057 and Nalco® 1129 all of which can be obtained from Nalco Chemical Company or the Levasil® types like Levasil 200E of the company Akzo Nobel. Furthermore the Highlink® types can be used.

Other suitable silica particles include SNOWTEX 20, SNOWTEX 30, SNOWTEX 40, SNOWTEX UP and SNOWTEX OUP (all manufactured by Nissan Chemical Industries, Ltd.).

Preferably the average particle size $D_{50}$ of the filler component b) is more than 5 nm. If the average diameter particle size $D_{50}$ of the filler component b) is less than 5 nm, deterioration in the adhesion to the substrate can occur due to crack formation.

In particular colloidal oxides like colloidal silicas having a average particle size $D_{50}$ of at least 5 nm (up to less than 500, preferably less than 400, preferably less than 300, preferably less than 200, preferably less than 100 nm) show a favorable balance between crack suppression and adhesion. A particle size of more than 500 nm is disadvantageous, since the transparency is impaired. The preferred particles provide a uniform spherical shape.

In principle it is possible to use as the filler component b) one or more types of filler components b), normally leading to a multimodal particle size distribution. In such a case the average particle size of all types of fillers is below 0.5 μm, preferably less than 0.4 μm. It is preferred to use fillers with monomodal particle distribution.

Preferred colloidal silicas are prepared by acidifying sodium silicate solutions, upon which aqueous colloidal silica dispersions are formed. Thus, for example, colloidal silicas are provided comprising 10 to 50 wt. % of $SiO_2$ dispersed in water. The preferred aqueous colloidal silica dispersions have a pH value in the range of pH>3 to <7, preferably a pH of 4 to 6.5, prevent immediate gelation of the coating composition, and have a low $Na_2O$ content such as less than 2 wt.-%, preferably less than 1 wt.-% $Na_2O$. The pH values are measured at a $SiO_2$ content of approximately 34 percent by weight in water.

Suitable acids for acidifying sodium silicate solutions include both organic and inorganic acids such as hydrochloric, acetic, citric, benzoic, dimethylmalonic, formic, glutaric, malonic, toluene-sulfonic, oxalic acid and the like. Also polymeric acids such as ionic exchange resins can be used. The specific acid utilized has a direct effect on the rate of silanol condensation which in turn determines shelf life of the colloidal silica composition.

Aqueous dispersions of the filler component b) in general need to be transferred into an at least partial organic phase in order to be miscible with the photocurable component a), in particular the acrylate component a). Preferably the water phase of the aqueous colloidal dispersions is replaced stepwise by azeotropic evaporation with C1-C4-alcohols (preferably isopropanol) and organic solvents like for example glycol ethers such as monopropylen-glycolmonomethylether are added as disper-sants. Optionally also component a) of the photocurable composition can be used as the dispersant alone or in combination with other non-reactive organic solvents. Further solvents include water-miscible polar solvents, such as acetone, butyl cellosolve, and glycolethers.

Since the colloidal metal oxides b) have the tendency to gel under condensation of the hydroxyl groups in particular after the evaporation of water and or alcohols it is preferred to provide a pretreatment before these solvents are stripped off and the particles are admixed into the binder matrix. This pretreatment step improves the performance of the oxidic colloidal materials since additional reactive groups can be introduced onto the surface of the colloidal metal oxides. Preferably during such pretreatment step the hydroxyl groups at the surface of the silica are reacted with treating agents such as silanes or siloxanes. In a preferred embodiment this treatment comprises the use of silanols or silanes according to the definition of component c). Such pretreatment step in particular can prevent gelation under storage since the condensation reactions of the hydroxyl groups are suppressed.

The reaction between the colloidal fillers and the silanes or siloxanes increase in particular the shelf life time and suppress gelation of the filler dispersions and in also of the photocurable composition.

If the silanes or siloxanes used in the pretreatment step of the filler component b) comprise in addition cross-linkable functional groups, in particular acrylate groups, then the filler component b) takes part in the cross-linking reaction of the binder component a). In this case generally the abrasion resistance of the cured composition is improved.

Condensation catalysts can accelerate the reaction between hydroxyl groups at the surface of the filler component b) and for example alkoxysilanes. Preferred condensation catalysts are selected from the group which consists of carboxylic acids such as formic acid, or a salts thereof, such as for examplefor example ammonium, sodium or potassium salts, quaternary ammonium carboxylates such as benzyltrimethylammonium acetate. The amount of catalyst is preferably about 1.5 weight percent related to the amount of the dispersion of the filler component b).

Suitable silanes to be used in the pretreatment step of filler component b) include in particular those which are used as component c) as defined below, and may have the formula $X_{3-n}Si-R_n$ as defined as set forth in component c) below.

An example of silyl acrylate modified colloidal silica is FCS100 manufactured by Momentive Perfomance Materials Inc. or also suitable are so-called Highlink OG dispersions from Clariant, which contain between 30 to 50 wt. % silyl acrylate (methacryloxypropyltrimethoxysilane) modified colloidal silica in isopropanol or di- and/or polyacrylate monomers. Preparation methods are for example for example described in the U.S. Pat. No. 5,468,789. Other commercially available products which can be used as silica particles, that take part in the cross-linking reaction, include "BEAMSET HC-900" and "BEAMSET HC-910" manufactured by Arakawa Chemical Industries, Ltd., and "DESOLITE Z7501" and "DESOLITE Z7503" manufactured by JSR Corporation.

The amount of filler b) in the curable acrylate coating composition may be adjusted depending upon the required properties such as adhesion, abrasion resistance, weather resistance, UV-light resistance as well as thermal crack resistance. The filler b) in the photocurable coating composition of the invention is preferably present in an amount of about 1 weight percent to about 40 wt. %, based upon the solid content of the curable coating composition, taking into account that if the pretreatment agent is used as described above such pretreatment agents are included in such weight percentage. In a particular preferred embodiment the filler b) is present in an amount of about 1.5 to about 35 wt.-%, preferably about 2 to about 30 wt.-% more preferred, about 2 to about 25 wt.-%, each based on the solid content (that is all components except solvents) of the photocurable coating composition. If the amount of the filler component b) is too small, the scratch resistance might be inferior, and if the amount of the filler component b) is too high cracking of the cured film might be observed.

The variation of the amount of the $SiO_2$ of component b) and that of the reactive silyl groups (optionally introduced by use of component c)) on the surface of the filler component b), has been found to influence the physical properties such as hardness, cracking and the abrasion resistance of the resulting hardcoat. A concentration of component b) with more than 5 wt. % of all component except solvent is preferred in order to improve scratch resistance defined below under test methods.

Silane or Siloxane Component c)

If the filler component b) is not already stabilized by any agent against gelation the use of a reactive silane or siloxane is an appropriate method to increase shelf life time as well as the abrasion resistance of the inventive photocurable coating composition. The use of component c) is in particular preferred if as component f) further oxidic fillers are employed for example acidic or basic oxides in order to provide matting effects by a mechanism described under component f1) below.

Preferred silanes include those of the formula:

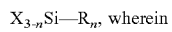

$X_{3-n}Si-R_n$, wherein n=1-3
X=alkoxy, alkanonoximo, for example butanonoximo, alkenyloxy, alkanoyloxy, alkanoylamino (carboxamide), preferably X=alkoxy, more preferably C1 to C4-alkoxy,
R=C1-C10-alkyl, C2-C14-alkenyl, like for example vinyl, allyl and hexenyl, vinyloxyalkyl, mercaptoalkyl, epoxyalkyl, acryloxyalkyl, methacryloxyalkyl, like in particular acryloxypropyl, methacryloxypropyl.

Particularly preferred compounds c) are selected from the group of di- and trimethoxy or di- and triethoxy silanes, which comprise as cross-linkable functional group for example m ethacryloxypropyl, acryloxypropyl, m ethacryloxym ethyl, acryloxym ethyl. The most preferred examples of compounds c) include acryloxypropyl trimethoxysilane, methacryloxypropyl trimethoxysilane, acryloxypropyl triethoxysilane and methacryloxypropyl triethoxysilane.

Examples of other alkoxysilanes include vinyltrialkoxysilanes, 3,3,3-trifluoropropyl-trialkoxysilanes, gamma-glycidoxypropyltrialkoxysilanes, methyltrimethoxysilane, ethyltrimethoxysilane and ethyltriethoxysilane, propyltriethoxysilane, propyltri-methoxysilane, octyltriethoxysilane, octyltrimethoxysilane, vinyltrimethoxysilane, vinyltriethoxysilane, isobutyltrimethoxysilane, and isobutyltriethoxysilane.

In a preferred embodiment of the present invention the photocurable coating composition comprises at least one part per weight of the silyl acrylate per 10 pt.-wt of component b), in particular $SiO_2$, to minimize gelation of the $SiO_2$ and to improve scratch resistance.

UV Stabilizer Component d)

In order to improve the weather resistance in particular the resistance against long term irradiation through UV light it is necessary to use a UV light stabilizer. UV light includes here in particular light of a wavelength of 200 to 400 nm.

The amounts of the UV stabilizer should be sufficient to provide increased weather-ability nevertheless yet still obtain adequate cure rates for the photocurable composition and in the depth of the film. Another requirement is that these stabilizers must provide certain solubility in the binder matrix or at least in the curable composition.

The term weather resistance means that the cured films pass in particular the following standards.

One method which is representative for others is the method of the Volkswagen company PV 3930/PV3929 as Florida and Arizona/Kalahari simulation, respectively. As a result after applying this test protocols one can evaluate crack formation, visible deterioration that is the surface remains unchanged in terms of color and gloss. This includes irradiation with Xenon lamps having specific irradiance of 0.5 $W/m^2$ and 0.6 $W/m^2$ at 340 nm. Another useful method for accelerated weathering is the method ASTM G 154 which uses 0.77 $W/m^2$ at 340 nm. The inventive compositions pass irradiation of at least 3200 h without visible deterioration which equals to at least 2 years of outdoor weather ability in Florida, Arizona and Kalahari climate.

Basically it is distinguished between two types of UV stabilizers, which have different mechanism of suppressing the negative effects of UV radiation. One type of UV stabilizers acts by absorbing UV light (in the following referred to as UV absorbers d2)) and another type of UV stabilizers acts by quenching radicals formed through UV light exposure (in the following referred to as UV stabilizers d1). According to the present invention a mixture of both types of UV stabilizers is preferred.

UV-Stabilizer d1)

UV-stabilizers d1 are generally selected from the group of the so-called 'Hindered Amines' (Hindered Amine Light Stabilizers (HALS)). Examples include in particular Tinuvin® 123, Tinuvin 292 or Tinuvin 152 (BASF), Sanduvor® 3058 (Clariant).

UV-Absorber d2)

It was found by the inventors that UV-Absorber d2) as second type of stabilizers are in particular suitable to provide in particular in combination with the UV stabilizer d1) to achieve long term weather resistance of the cured coatings. These UV-Absorbers are preferably selected from the group which consists of triazines, benzophenones, benzotriazoles and resorcinols. Examples of triazine materials are Tinuvin® 400, a product of Ciba, or Cyagard® 1164, for example a product of Cytec, 2-(4,6-diphenyl-1,3,5-triazin-2-yl)-5-(hexyloxy)-phenol; 2-(4,6-bis(2,4-dimethylphenyl)-1,3,5-triazine-2-yl-5-octyloxy)phenol etc.

Examples of benzotriazoles include 2-(2'-hydroxy-5'-methylphenyl) benzotriazole; 2-(3'-tert-butyl-2'-hydroxy-5'-methylphenyl)-5-chlorobenzotriazole; 2-(3',5'-di-tert-butyl-2'-hydroxyphenyl)-5-chlorobenzotriazole; 2-(2'-hydroxy-5'-methylphenyl)benzotriazole; 2-(2-hydroxy-5-methylphenyl)benzotriazole; 2-(2-hydroxy-5-tertbutylphenyl)-5-chlorobenzotriazole; 2-(2-hydroxy-3,5-di-tert-butylphenyl)benzotriazole; 2-(2-hydroxy-5-tert-butylphenyl) benzotriazole; 2-(2-hydroxy-4-octyloxyphenyl)benzotriazole and mixtures thereof.

Such ultraviolet light absorbing agents are also described by U.S. Pat. Nos. 4,278,804; 4,374,674; and 4,419,405; 4,299,746; 4,495,360 and 4,525,426, 5,391,795; 4,914,143; 4,544,582; 4,308,317 which are incorporated herein by reference.

Many of these materials can be supplied in the form of an organic solvent solution, if desired.

Other groups of UV stabilizers are selected among cyanoacrylates, hydroxybenzo-phenones, oxanilide derivatives, poly(ethylene naphthalates), formamidines, cinnamates, malonates such as benzylidene malonate derivatives and mixtures thereof.

Examples of these UV-light absorbers are selected from the group which consists of 2,2'-dihydroxy-4,4'-dimethoxybenzophenone; 2,4-dihydroxybenzophenone; 2,4,2',4'-tetrahydroxybenzophenone; 2-hydroxy-4-ocytyloxybenzophenone; 2-hydroxy-4-methoxybenzophenone; phenyl salicylate; phenyl benzoate 2-hydroxybenzophenone; 5-chloro-2-hydroxy-benzophenone; 2-hydroxy-4-n-octoxy-benzo-phenone; 4-dodecyl-oxy-2-hydroxybenzophenone; 2-hydroxy-4-octadecyloxybenzophenone; 2,2'-dihydroxymethoxybenzophenone; para tert.-butylphenyl salicylate; p-(1,1,3,3-tetra-methylbutyl)phenyl salicylate; 3-hydroxyphenyl benzoate; phenylene-1,3-dibenzoate and mixtures thereof.

The group of preferred UV-light absorbers d2) are preferably selected from the group which consists of resorcinol derivatives according to EP 824119 incorporated by reference hereby.

In some preferred embodiments, the UV absorber is one which is capable of co-reacting with either or both of the silanes being employed. Such materials are also described in the referenced U.S. Pat. Nos. 4,914,143; 4,680,232 and 4,374,674, which are both also incorporated herein by reference.

The most preferred resorcinols comprise the dibenzoyl resorcinol derivatives such as 4,6-dibenzoyl-2-(3-trialkoxysilylalkyl) resorcinol and preferably 4,6-dibenzoyl-2-(3-triethoxysilylpropyl) resorcinol. One preferred example is SDBR from Momentive Performance Materials Inc.

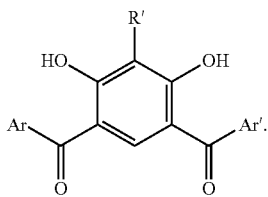

R' = trialkoxysilylalkyl

UV-absorbers can be used up to a level of 2 to 20 wt.-% based on the solid content of the coating composition.

In accordance with the present invention in a particular preferred embodiment a combination of Hindered Amine Light Stabilizers (HALS), in particular, Tinuvin® 123 Tinuvin 292 or Tinuvin 152 (BASF) and resorcinols such as 4,6-dibenzoyl-2-(3-trialkoxysilylalkyl) resorcinol and preferably 4,6-dibenzoyl-2-(3-triethoxysilylpropyl) resorcinol are used as UV stabilizer.

Photoinitiators Component e)

The light curable compositions contain one or more, preferably one or two kinds of a photoinitiator e) in order to enable the radically initiated crosslinking or polymerization reaction of the photocurable composition.

The photoinitiator can be preferably activated by UV or visible light. Examples of photoinitiators include: 1-phenyl-2-hydroxy-2-methyl-1-propanone; oligo {2-hydroxy-2-methyl-1-[4-(methylvinyl)phenyl]propanone}; 2-hydroxy-2-methyl-1-phenyl propan-1 one (DAROCURE® 1173,); bis(2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy)phenyl-2-hydroxy-2-(methylpropyl)ketone; 2,2-dimethoxy-2-phenylacetophenone; benzophenone; benzoic acid; and mixtures thereof.

Further the component e) includes 1-hydroxycyclohexyl-phenylketone (IRGACURE® 184, Ciba Specialty Chemicals); a 50:50 weight basis mixture of 1-hydroxycyclohexylphenylketone and benzophenone (IRGACURE 500, Ciba Specialty Chemicals); 2-benzyl-2-N,N-dimethyl amino-1-(4-morpholinophenyl)-1-butanone (IRGACURE 369, Ciba Specialty Chemicals); 2,2-Dimethoxy-1,2-diphenylethan-1-one (IRGACURE 651, Ciba Specialty Chemicals); bis(2,4,6-trimethylbenzoyl) phenylphosphineoxide (IRGACURE 819). Mixtures of photoinitiators can be used to obtain good absorption at short wavelengths for surface cure together with good absorption at long wavelengths for bulk cure. The component e) is preferably selected from the group which consists of benzoin, benzoin methyl ether, benzoin ethyl ether, benzoin propyl ether, benzoin-n-butyl ether, benzoin isobutyl ether, acetoin, butyroin, toluoin, benzil, benzophenone, para-methoxybenzophenone, 2,2-diethoxyacetophenone, alpha-,alpha-dimethoxy alpha-phenylacetophenone, methylphenyl glyoxylate, ethyphenyl glyoxylate, 4,4'-bis-(dimethylaminobenzo-phenone), propiophenone, acetophenone, 1-hydroxycyclohexyl phenyl ketone, 2,2-diethoxyacetophenone, ethylphenylpyloxylate, phenanthraquinone, and 2-hydroxy-2-methyl-1-phenyl-propan-1-one, Methyl benzoyl formate, thioxanthone photoinitiators like 7-chlorothioxanthone, 2,4-diethylthioxanthone and 2,4-diisopropyl-thioxanthone and acylophosphine oxide photoinitiators for example acylophosphine oxide, such as diphenyl(2,4,6-trimethylbenzoyl) phosphine oxide, benzoyldiethoxy-phosphine oxide.

It is preferred to use a combination of absorbers for UV B and UV A, that is alpha hydroxyketone+phosphine oxide derivatives. In one preferred embodiment of the present invention the photoinitiator comprises 2-hydroxy-2-methyl-1-phenylpropan-1-one, 2,4,6-trimethylbenzoyl-diphenyl-phosphineoxide Lucirin TPO (BASF), bis-(2,4,6-trimethylbenzoyl) phenylphosphineoxide (IRGACURE 819), 1-hydroxycyclohexylphenylketone (IRGACURE 184). Particularly preferred is a mixture of bis-(2,4,6-trimethylbenzoyl) phenylphosphineoxide (IRGACURE 819) and 1-hydroxycyclohexylphenylketone (IRGACURE 184).

Other photo-initiators hereby incorporated by reference are disclosed in U.S. Pat. Nos. 3,211,795; 4,451,634; 4,558,147; 3,759,807; 3,968,305; 3,966,573; 4,113,592; 4,131,529; 4,130,600 and 4,348,462. All of these patents are incorporated by reference into this disclosure for their teachings related to photoinitiators.

In addition to the photoinitiators sensitizers might be used, which act to absorb light of longer wavelengths and thereby activate the photoinitiators.

Since the photoinitiators and sensitizers absorb or transfer light energy, the amount of these additives is restricted in particular if thick-walled articles shall be cured completely through the depth of the film thickness. As will be explained below films, coatings or articles prepared from the photocurable composition of the present invention preferably have a dry thickness of below 3 mm.

The photoinitiator e) when used is added in an amount of 0.01 to 10 weight-% of the solid content of the composition (all components except solvents). The use of more than 5 wt-% (based on the solid content) of photoinitiator e) can decrease light transmission remarkably and impair the cure of the curable composition, since sufficient light energy is not available in deeper section of the article. Therefore, preferably between about 1 weight percent and about 6 weight percent of the photoinitiator used based on the total weight of the solids of the composition a) to g). If a sensitizer is used it might be necessary to adjust the amount of photoinitiator accordingly in particular depending on the thickness of the intended coating.

Typically, the photoinitiator is activated by incident light having a wavelength between about 200 nanometers and about 420 nm Since in the inventive formulations solid particles are used that might absorb parts of the UV-light during the UV-cure step, it is preferred to use separate photoinitiators e) for each separate range of wavelengths, that is for the range of 300-440 and for a surface-cure at 220 to 320 nm.

Component f)

As a further mandatory component the photocurable coating composition of the present invention comprises at least one component selected from the group consisting of particulate non-swellable fillers having an average particle size of $D_{50}$>0.5 µm f1) and soluble or at least swellable polymers f2). This terminology means that the photocurable coating composition comprises either component f1) or component f2) or comprises both components f1) and f2).

The components f1) is used in particular as so-called matting agents which are selected in particular from the group of inorganic and organic fillers having an average particle diameter $D_{50}$ of >0.5, preferably to >0.5 µm to 50 µm, more preferably 1 to 20 µm, still more preferably 2 to 10 µm. With respect to the method of measurement of the particle size it is referred to the description for the component b) above, that is, the Zetasizer. In order to distinguish the component b) from the component f1) the same method of measurement is used.

In particular the particle sizes (diameter) are determined by laser 'Dynamic Light Scattering' with a Malvern Zetasizer ZS. The method is also known as photon correlation spectroscopy or quasi-elastic light scattering following ISO 13320-1 (see also http://en.wikipedia.org/wiki/Dynamic light_scattering).

Particulate non-swellable fillers used in accordance with the invention include in particular fillers having a solubility of less than <1 wt.-%, more preferably less than 0.5 wt-% and more preferably less than 0.1 wt-% at 25° C. in the fluid phase of the photocurable coating composition. Furthermore preferably these particulate non-swellable fillers do not adsorb more than 300 wt. %, preferably not more than 250 wt-% of the the fluid phase of the photocurable coating composition (to be measured by mixing the filler component with the fluid components a), c), g) at 25° C. for 2 hours, separating the filler component by centrifugation for 10 minutes at >1000 g, optionally filtrating and weighing the wet filler). In general inorganic fillers are insoluble and less swellable than organic fillers.

The fillers have preferably melting points of >100° C. by a measurement through Differential Scanning calorimetry at a heating rate of 3° K/min.

It is preferred to use fillers and types of fillers which do not impart the transparency to an unacceptable low level, that is transmission of light at 400 nm should be >50% at 10 µm mm thickness of the cured photocurable coating composition of the invention according to ASTM 1003.

These particulate non-swellable fillers have an average particle diameter of $D_{50}$>0.5 µm which is greater than the particle size of the filler component b), which is less than 0.5 µm. Without being bound to theory it is believed that the presence of the particulate non-swellable filler—that is the matting agent f1)—has an effect on the structure of the cured coatings in that they provide visible particles under a light or electron microscope making the film surface appearance rough.

In a particular embodiment the non-swellable fillers have groups which are reactive with the photocurable components a). Such reactive groups are selected accordingly preferably from the group of radically activatable groups such as alkenyl, acryl, methacryl, vinylether groups. As described for the filler component b) such reactive groups can be provided by pretreating the particulate non-swellable fillers f1) with the component c).

Preferred particulate non-swellable fillers f1) include silica, quartz powders, inorganic oxides, nitrides, carbides sulfates, carbonates, thermoplastic powder, pulverulent polyorganosiloxanes, elastomer powders, microgels, silsesquioxanes, which as explained above, have preferably a solubility of less than <1 wt.-% at 25° C. in the fluid phase of the photocurable coating composition (in particular components a), c) and g)) and furthermore preferably do not absorb more than 300 wt. % of the the fluid phase of the photocurable coating composition.

The component f1) usually has a specific BET-surface of 0.2-250 m²/g. Such fillers are delivered under trade names like Acematt® by Evonik Degussa or Syloid® of Grace. They are based on precipitated or fumed silicas, zinc or aluminum oxides etc.

In one embodiment as disclosed for example in WO 03-91349 (incorporated herein by reference), these fillers are spherical silsesquioxanes, for example available under the trade name Tospearl®. These spherical particles consist of at least one polyalkylsiloxane comprising a $R^1$—$SiO_{3/2}$ group, wherein $R^1$ is in an organic group, in particular C1-C18-alkyl. The spherical core of such particles can be coated optionally with one siloxy group $R^1SiO_{3/2}$ wherein R1=C1-C18 hydrocarbon optionally comprising the reactive groups of unsaturated C2-C18-hydrocarbons. Preferably these reactive groups are at least on the surface of the siloxane, silsesquioxane or silicate core particle linked over SiO bonds to the core units. The preferred spherical particles consist of polyalkylsiloxane, silsesquioxane, and silicates containing $R^1$—$SiO_{3/2}$-groups, wherein $R^1$ is $R^1$ is a C1-C18 hydrocarbon, C1-C18-alkyl, preferably C2-C14-alkenyl, acrylate, methacrylate group. $R^1$ is preferably acryloxyalkyl, methacryloxyalkyl.

Another preferred group of matting agents f2) are selected from the group which consists of soluble or at least swellable polymer. The swellable or soluble polymers f2) used in the curable composition, although particulate in the dry state, do not retain their particulate form in the uncured composition comprising sufficient amount of solvents. The non-swellable matting agent f1) behaves differently. The swellable or soluble polymers f2) are preferably selected from the group consisting of non-reactive polymers soluble or swellable in the photocurable composition. Preferably the soluble or at least swellable polymers f2) have a solubility of greater than 1 wt.-%, preferably greater than 2 wt-%, more preferably greater than 5 wt-%, more preferably greater than 25 wt-% at 25° C. in the fluid phase of the photocurable coating composition (in particular components a), c) and g)).

The preferred non-reactive polymers used in the invention are acrylic or methacrylic polymers and copolymers, being prepared from acrylate or methacrylic monomers, and which polymers are at least swellable and/or soluble respectively in the photocurable composition.

It is preferred to use the swellable or soluble polymers f2) rather than the particulate non-swellable fillers f1), in particular, because of possible problems of nozzle build-up of the particulate non-swellable fillers f1) in the case an ink-jetting technique is selected to coat the target substrate.

The component f2) in particular provides a matting effect (low gloss) in the cured composition. Such a matting effect is desirable to provide a better visibility of the decor, pattern or image to be coated. The matting effect is driven by the amount of the component f) and also by the conditions of the irradiation.

It was found by the present inventors that apart from using the component f) further parameters may promote the matting appearance of the cured compositions. In particular in case that the amount of component f) is less than 20 wt.-%, preferably between 5-15 wt. %, based on the solid of the photocurable composition. It is preferred to have a pre-cure step with irradiation of light of a short wave length (preferably in the range of 160-190 nm) under inert gas for example nitrogen, leading to a curing mainly in the surface of the coating composition. The complete curing is then affected with light of a longer wavelength (that is more than 200 nm).

In a case where the UV absorber component d2) is used, it is preferred to use more than >10 wt.-% component f) related to the solid of the curable composition, and a pre-cure step might then be dispensable.

The presence of component f2) is particularly advantageous in the use of the photocurable compositions comprising the UV stabilizer d), and in particular in the presence of the UV-light absorber d2).

In accordance with the present invention cured coatings can be obtained having an excellent matt surface and an improved weather and light resistance using in particular component f2) in combination with the UV light absorber d2), even if a pre-cure irradiation step with a short wavelength is omitted. In accordance with the present invention it is possible to achieve a wizen matt surface of the cured film.

The cured coatings in accordance with the present invention preferably provide a matting effect expressed by the gloss units as determined according to DIN 67530 (ASTM D2457)) at 60° of preferably <70, more preferably less than 60, still more preferably less than 50.

Without being bound to theory, it is believed that in particular the precure step with shorter wavelengths induces a stronger crosslinking density by creating additional radical sites not only among the radically reactive groups of the photocurable component a) but also at other molecule sites (for example in the swellable or soluble polymers) for example due the abstraction of atoms induced by the high energy irradiation.

The preferred swellable or soluble polymers f2) are polymers selected from the group of polymers having a Hansen solubility parameter δ of 14-18 $(MPa)^{1/2}$ [ 1 $(MPa)^{1/2}$=0.49 $(cal/cm^3)^{1/2}$].

Furthermore it has been found by the present inventors that in order to achieve an excellent matting effect, the weight ratio of the (non UV-reactive) swellable or soluble polymers, in particular of polyalkyl(meth)acrylates f2) to photocurable components a), in particular UV-reactive acrylates a) should be 1:3-1:17.

In a preferred embodiment the swellable or soluble polymers f2) are essentially non-polymerizable (that is they have essentially nearly no polymerizable functional groups) and comprises acrylic polymers consisting of a poly-C1-C8-alkyl(meth)acrylate or C1-C8-alkyl(meth)acrylates copolymer with different C1-C8-alkyl groups.

The term (meth)acrylate in the present invention intends to mean either acrylates or methacrylates. In the present invention poly-C1-C4-alkylmethacrylates are preferred as component f2).

The non-polymerizable or non-reactive acrylates f2) can consist of the units shown of the following formula (1).

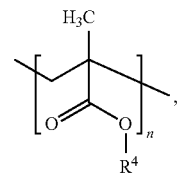

(1)

wherein $R^4$ represents a C1 to C8-alkyl group, which include all kinds of isomeric alkyl groups, including n-alkyl groups, isoalkyl groups, sec.-alkyl groups and tert.-alkyl groups, like for example C3-C8 and C4-C8-alkyl groups. Particularly preferred $R^4$ is a group having 4 carbon atoms, like n-butyl, sec.-butyl, isobutyl and tert.-butyl, with isobutyl being the most preferred group $R^4$.

The term non-reactive polymer means that this polymer is essentially free of unsaturated groups and essentially cannot be activated for the radical polymerization with the photocurable component a). The preferred polyacrylates for component f2) have a degree of unsaturation of <0.07 mmol/g.

The preferred matting agent f2) are polybutylmethacrylates, which are selected in particular if an ink-jet process for applying the curable matt topcoat composition is applied. In such process the curable inventive composition passes through ink-jet nozzles in said ink-jet printing process. One preferred group comprises polyalkyl-(meth)acrylate, polyacrylate polymers and copolymers thereof. Preferred are n-butyl-methacrylate, isobutylmethacrylate polymers, n-butyl-isobutylmethacrylate copolymers, most preferred are isobutylmethacrylate polymers preferably having a range of a molecular weight between 10,000-400,000 g/mol, preferably >20,000 g/mol. The most preferred isobutylmethacrylate polymers provide molecular weight of $M_n$=20,000 to 400,000 g/mol determined by GPC using polystyrene standard at 25° C. The degree of unsaturation of the polyalkyl (meth)acrylates measured by a iodometric titration is preferably below 0.07 mol. %.

The cured coating compositions preferably have a gloss value according to DIN 67530 (ASTM D2457) at 20° or 60° of preferably a gloss of <60, most preferred a gloss value of <50. Accordingly, the component f) is preferably added in an amount sufficient to achieve such gloss value.

If spray nozzle equipments other than ink-jet heads with greater diameters are used or other coating processes for the topcoat application, the matting agent can be selected also from the group defined under f1) comprising particulate fillers with D50 values of 0.5-50 μm.

Solvent Component q)

In accordance with the present invention one or more solvents, in particular organic solvents are used. The purpose of the solvent is to adjust the viscosity of the curable composition in order to support the process conditions, enable to form a film of the desired thickness and the desired folded surface under curing condition. Therefore at least one solvent is applied which is characterized by its solubility and evaporation parameters.

Suitable solvents are selected from the group of polar solvents having for example at least one of the following parameters:
- a dielectric constant between 4-70,
- a surface tension >20 to <30 mN/m,
- a Hansen solubility parameter of 15 to <23 $[MPa]^{1/2}$
- a dynamic viscosity of less than <100 mPa·s at 25° C.,
- a relative evaporation rate of <2 (versus standard=n-butyl acetate=1).

The addition of the solvent(s) should generally ensure curable compositions with the preferred dynamic viscosity of 1-400 mPa·s at 25° C. and a shear rate of $D=10\ s^{-1}$ or a dynamic viscosity of 1-50 mPa·s at 50° C. and a shear rate of $D=10\ s^{-1}$ for an ink-jet process.

In addition the solvent(s) should provide a sufficient ability to solve or at least to swell component f2).

A further requirement is that the solvent shall not readily dissolve the plastic substrate to be coated but has a relative evaporation rate in the desired range and the ability to dissolve the ingredients of the curable composition. Suitable solvents are selected from the group of aliphatic alcohols, glycol ethers, cycloaliphatic alcohols, aliphatic esters, cycloaliphatic esters, halogenated aliphatic compounds, halogenated cycloaliphatic compounds, halogenated aromatic compounds, aliphatic ethers, water; alcohols such as isopropyl alcohol (IPA) or ethanol; ketones such as methyl ethyl ketone, cyclohexanone, or acetone; aromatic hydrocarbons; isophorone; butyrolactone; N-methylpyrrolidone; tetrahydrofuran; esters such as lactates, ace-tates, including propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate); iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like. Further preferred solvents include propyleneglycolmethylethers, such as ethoxyethanol, butoxyethanol, 1-methoxy-2-propanol, cycloaliphatic ethers, amide solvents, and sulfoxide solvents. Preferred solvents include 1-methoxy-2-propanol, methylisobutylketone, diisobutylketone, butoxyethanol, methoxypropyl-acetate, and mixtures thereof. Preferably mixtures of at least two solvents are used. A particular preferred embodiment comprises a mixture of 1-methoxy-2-propanol and methylisobutylketone or diisobutylketone, Generally, the amount of the solvent in the coating solution is about 5 weight percent to about 70 wt.-%, preferably between about 30 wt. % and about 60 wt. % based on the total amount of the photocurable composition. In a preferable embodiment the component f2) is dissolved or swelled in the solvent and then admixed together with the ingredients of the curable composition.

Auxiliary Additives h)

The auxiliaries h) comprise in particular sensitizers and leveling agents.

Sensitizers

If the radically initiated polymerization or cure shall take place at higher wavelength of visible light or the layers which shall be cured have a thickness of less than 1 mm an additional sensitizer is used.

The sensitizer component is a compound which absorbs visible light, that is, light having a wavelength ranging from about 400 nm to about 800 nm and is capable of transferring energy to the photoinitiator e) or another catalyst for example a platinum or onium metal complex such that the desired crosslinking reaction is initiated upon exposure to visible light.

Sensitizers are preferably selected from two classes of compounds: 1) polycyclic aromatic compounds, and 2) aromatic compounds containing a ketone chromophore. Representative examples of polycyclic aromatic sensitizers suitable for the invention include anthracene, 9-vinylanthracene, 9,10-dimethylanthracene, 9,10-dichloro-anthracene, 9,10-dibromoanthracene, 9,10-diethylanthracene, 9,10-diethoxyanthrax-cene, 2-ethyl-9,10-dimethylanthracene, naphthacene, pentacene, benz[a]anthracene, 7,12-dimethylbenz[a]anthracene, azulene, and the like. Representative examples of aromatic ketone sensitizers suitable for this invention include 2-chlorothioxanthone, 2-isopropylthioxanthone, thioxanthone, anthraquinone, benzophenone, 1-chloro-anthraquinone, bianthrone, thioxanthone, 2-chlorothioxanthone, 1-chloroanthrax-quinone and the like. The amount of sensitizer ranges from about 50 to about 50,000 ppm, preferably between 500 to 5000 ppm of the total solid composition.

These additives are selected from the group of various flatting agents, surface active agents, thixotropic agents, UV light stabilizers and dyes. All of these additives and the use thereof are well known in the art and do not require extensive discussions. Therefore, only a limited number will be referred to, it being understood that any of these compounds can be used so long as they do not deleteriously affect the photocuring of the coating compositions and do not adversely affect the non-opaque character of the coating.

Leveling Agents

In one embodiment the curable coating composition may optionally contain various additives such as flattening or leveling agents, which are preferably polyethermodified polydimethylsiloxane for example BYK 333, BYK 307 or such as products BYK-353 which is a polyacrylate solution or BYK 310 which is a polyester modified polydimethylsiloxane all available from BYK-Chemie (Germany). Also reactive acrylate modified leveling agents can be used. The reactive acrylate is incorporated into the cured coated composition by means of radical polymerization. Examples are BYK UV 3500 which is a polyether modified acryl-functionalized polydimethylsiloxane or BYK UV 3570, which is a polyester modified, acryl-functionalized polydimethylsiloxane leveling additive. Surface active agents, for example BYK-Silclean 3710, which is a polyether modified acryl funtionalized polydimethylsiloxane (also available from BYK-Chemie), thixotropic agents (for example Cellulose acetate butyrate, available from Aldrich Chemicals), and the like, and reaction products and combinations comprising at least one of the foregoing additives. Such additives are employed to achieve an uniform film in a shorter time. These additives can also work as de-aering agents in order to release entrapped air in shorter time when the film has been spread over the surface over the substrate The various surface-active agents, including anionic, cationic and nonionic surface-active agents are described in Kirk-Othmer Encyclopedia of Chemical Technology, Vol. 19, Interscience Publishers, New York, 1969, pp. 507-593, and Encyclopedia of Polymer Science and Technology, Vol. 13, Interscience Publishers, New York, 1970, pp. 477-486, both of which are incorporated herein by reference.

Definition of the Total Composition

The light curable composition providing a matt scratch-resistant film after the curing step comprises preferably (pt.wt.: parts by weight):

I) general composition:
- 10-200 pt.wt. of curable acrylates a) (the term acrylates here and in the following includes acrylates and methacrylates),
- 0.5-20 pt.wt. of colloidal metal oxide b) (in case dispersions of b) in a) are used only component b) is counted),
- 10-300 pt.wt. of at least one solvent g),
- 0.5-10 pt.wt. of at least one photoinitiator e),
- 1-30 pt.wt. of at least one matting agent f),
- 1-22 pt.wt. of at least one UV absorber d),
- 0-15 pt.wt. auxiliary additives.

II) a preferred inventive composition
- 15-150 pt.wt. of curable acrylates a),
- 1-15 pt.wt. of a colloidal silica b),
- 30-250 pt.wt. of at least one solvent g),
- 0.5-6 of at least photoinitiator e),
- 1-20 pt.wt. of at least polymeric matting agent f2),
- 1-22 pt.wt. of at least UV absorber d),
- 0-15 pt.wt. auxiliary additives.

III) the most preferred inventive composition
- 20-146 pt.wt. curable acrylates a) consisting of:
  - multifunctional acrylates (f≥5), preferably hexaacrylates: 8-48 pt.wt., triacrylates: 10-33 pt.wt;
  - aliphatic (non-urethane) diacrylates: 2-32 pt.wt., and aliphatic urethane diacrylate: 0-33 pt.wt.
- 0.5-20 pt.wt. colloidal silica b) coated with acryl functional silyl groups of component c),
- 30-250 pt.wt. of at least one preferably at least two solvents g),
- 0.5-5 of at least one photoinitiator e),
- 1-20 pt.wt. matting agent selected from the group of non-reactive acrylates f2),
- 1-22 pt.wt. of at least on UV absorber d) selected form the group of resorcinol or triazines derivatives,
- 0.01-3.5 pt.wt. of a leveling additive h).

Typical compositions of the invention are showing a surface tension 18-35 mN*m$^{-1}$, preferably 20-25 mN*m$^{-1}$ which is preferably smaller than the surface to be coated. Examples showing the preferably applicable range are for example decane (13.5 mN*m$^{-1}$), formamide (39 mN*m$^{-1}$), or methylformamide (33 mN*m$^{-1}$).

The solubility properties of the curable composition should be as such that the plastic substrate or the surface coated with a paint or an ink of an image are not destructed that is get swollen and delaminated.

The surface tension of the substrates is preferably between 27-100 mN*m$^{-1}$ such as polycarbonate, polyesters, cured or pre-cured inks 25 mN*m$^{-1}$ for imaging.

The inventive composition is preferably selected for process conditions of an ink-jet process using a tailor made solvent package to enable short process times.

The invention further discloses conditions for the use of the inventive composition in an ink-jet process for the coating of a treated surface such as plastic, resinous duromeric wooden or metallic substrates with and without pre-treatment or coatings of the substrate.

One aspect of the invention is to provide a weather and scratch resistant topcoat for decorative surfaces. The decor can be selected of a wood decor, printed or jetted images, or a pattern. The inventive composition comprising a matting agent is applied as top coat onto the printed decor or pattern whereby the top coat is applied preferable through nozzles of an ink-jet printing head. The matt appearance becomes visible after the drying or curing step involving irradiation with UV light. The cured coatings are weather and scratch resistant.

The improvement of the inventive composition in the ink-jet process was to select the matting agent from the group of non-reactive acrylates which have a certain intended incompatibility to the reactive acrylate binder matrix of the curable coating composition, whereby the matting effects appears after or during the pre- and/or final cure of the coating film. Such films display a matt folded surface in the top coat having low gloss.

This effect can be strengthened using an Excimer UV-lamp with a wavelength of <300 nm under an inert atmosphere (for example nitrogen) in order to cure and crosslink the dried composition.

It is a preferred embodiment of the invention to provide a coating composition which is weather resistant and scratch resistant after the cure. The invention achieved in getting these properties by addition of at least one UV stabilizer, an additive for improving scratch resistance, a matting agent, at least one photoinitiator and appropriate solvents.

Process Details

The curable acrylate coating composition could be coated onto articles employing conventional coating techniques. These may include, for example, flow coating, dip coating, roll coating, spray coating, or drawing down the coating onto the substrate using a doctor blade.

The preferred methods comprise all kinds of spray coating using. Manually applied spray guns and the like can be used as well ink-jet print heads having usually nozzle diameters of 0.1 to 2 mm for spray guns down to 10-50 μm of ink-jet printheads.

Preferred apparatuses which are employed for the coating step are continuously running belts, transporting the substrates to be coated, having line speeds of 2-50 m/min or dirigible, movable x-y-desks controlled by a computer program. These means provide articles having a variety of surfaces, including ink-jetted images, pictures or decors to be coated.

The scratch and weather resistant topcoat made out of curable composition of the invention for example on the decor images should preferably have a dry thickness (after curing) of about 1 micron to about 50 microns (μm), more preferably the range is of about 3 microns to about 25 μm (microns), which relates to coating weights after drying of 3.6-30 g/m$^2$. The topcoat is preferably applied in one shot and one layer onto a substrate preferably through any nozzle, most preferred through an ink-jet nozzle. The previously printed images or decors based on curable inks are at least dried or previously cured. Preferably images or decors comprising light curable inks are applied and cured with UV light before the coating and curing step of the layer made out of the curable composition of the invention forming the topcoat.

According to the requirements defined by the kind and properties of the various substrates a suitable surface tension of the composition of the invention to be coated (preferably ink-jet-coated) and a number of dots/inch is selected to achieve either a perfect image décor or a sufficient thickness.

In the process of applying the coating composition of the the invention it is preferred to use one or more print heads comprising ink-jet nozzle(s) which have the same dimension as the printing heads used for the previously applied inks in the image or décor printing step.

Such print heads which are used for the ink-jetted decor surface as well as for the invented topcoat is for example a Xaar 1001 print head which has a sufficient solvent resistance in view of component g). A typical setup of the print head is:

Head base setting: 21 V; Temperature of the coating composition: 40° C.

Flow rate: 100 mL/min and 10-24 droplets per drop (dpd).

It is in the scope of the inventive process to employ more than one print head in order to manage the desired coating weights in the scheduled residence times of the process.

Optionally after a physical drying process of 5-20 sec at room temperature (20-30° C.), a convection oven or IR source is used for pre-heating between 20 to 120 sec, whereby the maximum peak surface temperatures of in between 50 to 90° C. can be achieved.

After the optional preheating step the UV-light cure steps of the embodiments A) and B) are following in the sequence of the process steps:

A) Embodiment 'Direct Cure':
  The UV-curing phase is for example carried out under a medium pressure mercury UV-lamp (undoped) with an electrical power of 80-200 W/cm bulb length. The UV-A energy and power received on the surface was measured by using an EIT Power Puck®. The preferred wavelength of this process is between 200 to 440 nm.
  The curable composition is irradiated with a power of at least 0.1 W/cm$^2$ and an energy of at least 1 J/cm$^2$. The useable UV-lamps are available from IST Metz NUrtingen (Germany), Nordson Ohio (USA), Dr. Hoenle AG Munich (Germany).

B) Embodiment 'Pre-Cure and Post-Cure':
  In certain cases it is preferable to use a pre-curing step using UV-light of a comparatively low wavelength, which is preferably carried out under inert gas, preferably nitrogen.
  This pre-curing step helps to enhance the surface matting effect. Preferably wavelengths<200 nm are used, for example a 172 nm excimer UV-lamp, Xenon filled was used (Exirad 172, IOT Leipzig, Germany) in order to generate a surface folding process that is assumed to be driven by a free radical polymerization, which is essentially not initiated by the photoinitiator. Possible inhibiting side effects towards V(acuum)-UV/UV-C-light (10 to 200 nm) are preferably excluded by carrying out this pre-curing step under inert gas, which was nitrogen. After the composition is pre-cured a post-curing step is carried out which is described in embodiment A). The preferred applied wavelength of UV-light for embodiment B) is <200 nm.

The preferred process for making matt top coat films is embodiment B), with coating compositions comprising component f2).

The embodiment A) may also be applied for the image printing steps with curable inks. For the image pre-cure preferably a so called "pinning" process is used, which is preferably carried out with UV-LED source adapted to the wavelength of the photoinitiator system used in the ink formulation.

The irradiation times for the steps A) and B) defined before are generally between 1-10 sec and the energies are generally between 0.5 to 5 J/cm$^2$±10% measured at the surface of the substrate with a dosimeter EIT®LLC Power Puck® (EIT Industries, Sterling, Va., USA).

The matting intensity increases with higher concentrations of f2) as discussed before. Under a light microscope a folded surface can be observed. The matting intensity corresponds to the gloss values. The lower the gloss values the higher the matting intensities are.

Substrates

The inventive curable coating composition is able to protect nearly all surfaces of substrates.

The preferred substrates to be coated are selected from the group which consists of duromeric plastics, thermoplastics, metals, woods, ceramics, glass and the like, whereby these materials can already provide a first coating material such as a lacquer or a paint or one or more dried or cured inks of a décor or image.

In another preferred embodiment the transparent curable topcoat of the invention can be used to protect transparent substrates.

Preferred substrates are pre-coated or not pre-coated thermoplastic substrates, aromatic thermoplastics, like polycarbonates based on bisphenol A, printed images or decors on rigid or flexible substrates like thin sheets and films. The thickness of substrate films is for example in the range of from 15 to 250 μm.

The preferred transparent materials are selected from the group which consists of aromatic polycarbonates, poly(diphenylolpropane)carbonate and poly(diethylene glycol bis allyl)carbonate, polyacrylates, polymethacrylates (PMMA), polyethylene-dicylopentadien-polymers (COC) such as Apel® Mitsui Chemicals Topas® COC, Crystal® DEW, polymethacrylmethylimide (PMMI) that is partially imidized methacrylic polymers such as Kamax®, Pleximid, polyvinylchlorides, polyethylenes (LDPE, HDPE), polypropylene, polyurethanes, polystyrenes, polyetylenterephthalate, polybutylenterephthalate, polyphenylenesulfides, polyphenylenesulfones, polyesters, reaction products of polyepoxides with polyamines and or polyols, ABS, SAN, polyamides, polyimides, copolymers of acrylonitrile-styrene ABS, styrene-acrylonitrile-butadiene copolymers SAN, polyvinyl chloride, butyrates and the like.

If the substrates to be coated comprise already a coating layer these layers are selected form the group of binder materials for lacquers, coatings, inks, primer compositions.

These pre-coatings, including solvent, can be adhered to substantially all solid surfaces. The pre-coatings or primers can serve to achieve making a plastic surface solvent resistant or can serve to provide a layer which comprises a light absorber or light filter or can serve as adhesion layer between substrate and topcoat.

Description of Coated Articles

The inventive coatings and the process to apply this coating is preferably used for the manufacture of articles. Suitable articles are in particular those made from thermoplastic substrates which can be utilized in the practice of the present invention to produce shaped thermoplastic articles having enhanced abrasion resistance, for example, substrates like Lexan® or Makrolon® polycarbonate, Valox® polyester, Mylar® polyester, Ultem® polyetherimide, PPO polyphenyleneoxide, polymethylmethacrylate, etc., metals such as steel, aluminum, metallized thermoplastics, etc.

Transparent polymeric materials coated with these compositions are useful as flat or curved enclosures, such as windows, skylights and windshields, especially for transportation equipment. Plastic lenses, such as acrylic or polycarbonate ophthalmic lenses. They can be coated with the compositions of the invention. In certain applications requiring high optical resolution, it may be desirable to filter the coating composition prior to applying it to the substrate.

The preferred articles made by the use of the light curable composition are manufactured in the inventive process by ink-jetting an image or decor layer and finally a scratch resistant topcoat layer.

The preferred articles are selected from the group which consists of decorative building elements, window frames, doors, garage doors, road signs, traffic signs guideposts, stickers, identity cards, credit cards, automotive parts, windshields, transparent roofs or windows for cars, vehicles, aircrafts, eyeglasses, eyeglass frames, writing utensils, keypads, displays and other optical articles, as well as flexible films and sheets, rigid films and sheets, textile substrates whereby the topcoat is a transparent abrasion resistant matt layer onto a décor or an image adhering onto a substrate.

Detailed Process Conditions

In one preferred embodiment the coated article is manufactured by a process comprising the steps of providing a primed metal substrate and forming a décor onto said substrate with an industrial digital ink-jet printer equipped with a sufficient number of ink-jet print heads (for example Xaar 1001) in order to generate a colored décor using 4 different colored inks to provide a décor made from cyan, magenta, yellow and black (CMYK). The substrate is layed down on an automated transport system and transported through the ink-jet print station at a line speed of for example 5 to 30 m/min. The ink is applied in single pass coating step and pre-cured with an UV-Led lamp sufficient for the receptor UV-wavelength of the photoinitiators used for the individual ink composition. The pre-cure process of the décor ink is called "pinning". In specific cases a plasma, UV, corona or flame pre-treatment of the substrate is advantageous.

In the preferred embodiment the substrate having a decor, a pattern or an image on its surface, is then coated with the coating composition of the invention preferably by spraying the composition as onto the surface of said decor, pattern or image.

Preferably the inventive composition is sprayed or ink-jetted onto the décor surface after the pinning process. In the case of ink-jetting a sufficient number of ink-jet heads has to be mounted into a second print station to achieve a cured dry film thickness of the inventive formulation of 5-20 μm. In a preferred embodiment a piezoelectric ink-jet head Xaar 1001 is used. The uniformity and wet coating thickness of the deposited clear topcoat layer is modified by the used control program of the ink-jet head and can be optimized by adapting the target viscosity of the inventive formulation to the viscosity working window and the operating temperature of the ink print head.

Preferably after the coating process the wet coating is allowed to air-dry for 5-15 sec at 20-40° C. and further physical dried at 50-80° C. surface temperature for 15-60 sec. For the drying process a convection oven, an infrared or combined infrared heated and convection oven can be used. In a preferred embodiment convection oven heat can be applied.

The cure step of the inventive composition is preferably carried out using medium pressure UV-bulbs at 80-250 W/cm at the given line belt speed of 5 to 30 m/min. In a preferred embodiment a pre-cure step is carried out. In such pre-cure step the substrate is preferably guided through a nitrogen purged housing and treated with a UV-Excimer lamp (Exirad 172), IOT Germany in order to achieve a sufficiently matt surface by a surface folding effects initiated by radical polymerization substantially without photoinitiator contribution.

Generally the UV-light used in the coating process according to the invention has a wave length of 150 to 440 nm.

The preferred coating process comprises the steps:
v1) irradiating the coated substrate with UV-light of a wave length of less than 200 nm, and subsequently
v2) irradiating the coated substrate obtained in step v1) with UV-light of a wave length of 200 to 440 nm.

In the coating process according to the invention, the formation of the decor, the pattern or the image and the spraying of the composition according to the invention are carried by an ink-jet printing process.

The preferred ink-jet printhead nozzle diameter is 5-50 μm.

The present invention also relates to the coated articles comprising the cured composition obtained by curing the inventive compositions as a transparent topcoat.

Preferably the coated articles are for outdoor applications.

Preferred coated articles have a multilayer coating comprising:
a) a substrate
b) optionally at least one primer layer onto said substrate,
c) a colored or decorative layer, and
d) a transparent topcoat layer formed by curing the inventive coating compositions.

PREFERRED EMBODIMENTS OF THE INVENTION

Embodiment 1

A photocurable coating composition comprising
a) at least one photocurable component,
b) at least one filler having an average particle size of D50<0.5 μm,
c) optionally one or more silanes or siloxanes,
d) at least one UV stabilizer,
e) at least one photoinitiator,
f) at least one component selected from the group consisting of particulate non-swellable fillers f1) having an average diameter particle size of D50>0.5 μm and swellable or soluble polymers f2), and
g) optionally one or more solvents,
h) optionally one or more auxiliaries.

Embodiment 2

The embodiment according to embodiment 1, wherein the photocurable component a) comprises at least one acrylate having one or more functional acrylate groups.

Embodiment 3

The embodiment according to embodiments 1 or 2, wherein the photocurable component a) comprises at least one acrylate having an acrylate functionality of 2 to 4 and at least one acrylate having an acrylate functionality of 5.

Embodiment 4

The embodiment according to any of embodiments 1 to 3, wherein the component f) is selected from particulate non-swellable fillers f1) which are selected from the group consisting of oxides and hydroxides of the metals selected from Al, Ce, Hf, Si, Sn, Ti, La, Zn and Zr.

Embodiment 5

The embodiment according to any of embodiments 1 to 4, wherein the component f1) is selected from silicas.

Embodiment 6

The embodiment according to any of embodiments 1 to 5 wherein the component f) is selected from swellable or soluble polymers f2) preferably having a molecular weight Mn of 50 000 to 150 000 g/mol (determined by GPC using polystyrene as a standard).

Embodiment 7

The embodiment according to any of embodiments 1 to 6, wherein the component f) is selected from swellable polymers f2) which are selected from the group consisting of polyacrylates and polymethacrylates.

Embodiment 8

The embodiment according to embodiments 6 or 7 wherein the polyacrylates and polymethacrylates are selected from the group consisting of poly((C1-C5)alkylacrylates) and poly((C1-C5)alkylmethacrylates).

Embodiment 9

The embodiment according to embodiments 6, 7 or 8, wherein the polyacrylates and polymethacrylates are selected from the group consisting of poly(n-butyl-, isobutyl-, sek.-butyl- or tert.-butyl)acrylates and poly(n-butyl-, isobutyl-, sek.-butyl- or tert.-butyl)methacrylates.

Embodiment 10

The embodiment according to any of the embodiments 1 to 9 having a dynamic viscosity of 1-400 mPa·s at 25° C. and a shear rate of D=10 s-1.

Embodiment 11

The embodiment according to any of the embodiments 1 to 10 having a dynamic viscosity of 1-50 mPa·s at 50° C. and a shear rate of D=10 s-1, and wherein the component f) is a swellable polymer.

Embodiment 12

A coating process for coating a substrate comprising the step of applying the composition as defined in any of the embodiments 1 to 11 onto the surface of a substrate to be coated.

Embodiment 13

The coating process for coating a substrate according to embodiment 12, comprising the step of applying said composition by a spray-coating process.

Embodiment 14

The coating process according to embodiments 12 or 13 which comprising the steps of:

i) providing a substrate,
ii) forming a decor, a pattern or an image onto said substrate,
iii) spraying the composition as defined in any of the embodiments 1 to 9 onto the surface of said decor, pattern or image,
iv) optionally drying the coated surface, and
v) irradiating the coated substrate with UV-light.

Embodiment 15

The coating process according to embodiments 12 or 13 which comprising the steps of:

i) providing a transparent substrate,
ii) spraying the composition as defined in any of the embodiments 1 to 9 onto the surface of said substrate,
iii) optionally drying the coated surface, and
iv) irradiating the coated substrate with UV-light.

Embodiment 16

The coating process according to embodiment 14 or 15, wherein the UV-light has a wavelength of 150 to 450 nm.

Embodiment 17

The coating process according to any of the embodiments 12 to 16, which comprises the steps of:

v1) irradiating the coated substrate with UV-light of a wave length of less than 200 nm, and subsequently
v2) irradiating the coated substrate obtained in step v1) with UV-light of a wave length of 200 to 440 nm.

Embodiment 18

The coating process according to any of embodiments 12 to 17 wherein the formation of the decor, the pattern or the image of step ii) and the spraying of the composition of step (iii) are carried out by an ink-jet printing process.

Embodiment 19

The coating process according to any of embodiments 12 to 18, wherein the spraying step (iii) is carried out with spraying nozzles having a diameter of 5-50 μm.

Embodiment 20

The coating process according to embodiments 18 or 19, wherein the ink-jet printing step (ii) is carried out with spraying nozzles having a diameter of 5-50 μm.

Embodiment 21

The coating process according to any of the embodiments 12 to 20, wherein steps ii) and iii) are carried out with an ink-jet nozzle controlled by a computer program.

Embodiment 22

Coated articles comprising the cured composition obtained by curing the compositions as defined in any of the embodiments 1 to 11 as a transparent topcoat.

Embodiment 23

Coated articles according to embodiment 22 having a gloss value according to DIN 67530 (ASTM D2457) at 60° of <60.

Embodiment 24

Coated articles according to embodiment 22 or 23 for outdoor applications.

Embodiment 25

Coated articles according to any of embodiments 22 to 24, having a multilayer coating comprising:
a) a substrate
b) optionally at least one primer layer onto said substrate,
c) optionally a coloured or decorative layer, and
d) a transparent topcoat layer formed by curing the compositions as defined in any of the embodiments 1 to 10.

Embodiment 26

Coated articles according to any of embodiments 22 to 25 selected from decorative elements, signs, stickers, automotive parts, eyeglasses, eyeglass frames, writing utensils, displays, other optical articles, flexible films and sheets, rigid films and sheets, and keypads.

Test Methods

Gloss for Evaluation of the Matting Effect

The evaluation of the matting effect was carried out by measuring the gloss with a hand-held gloss meter such as those available from Byk-Gardner (BYK-Gardner GmbH, Geretsried, Germany, for example Micro-Tri-gloss. The 20°/60° Gloss was measured at different sites (n=3). The average value is shown in the table 1 b.

A second evaluation measuring the 20° Gloss is recommendable. This evaluation at a lower angle results in a lower gloss value, that is, more matting or less reflected light.

Scratch Resistance Method (Steel Wool Test)

A steel wool peace of 2×2 cm was fixed with a double sided adhesive tape on a cylindric body of 1 kg weight (cylindric, d=4 cm, height=7 cm), whereby a steel wool type 0000 (fine of company Rakso, Lahr, Germany) was used. The weight was moved across the coated surface on a length of 10 cm back- and forward with 10 double scrubs.

The coated side was treated in the way described above

Categories of evaluation

A) Value 0: No visible scratches
B) Value 1: Slight scratches until 10 individual scratches which having a length of up to 1 cm
C) Value 2: Number of >10 scratches having a length of more than 1 cm.
D) Value 3: The whole surface area is scratched uniformly, the individual scratches cannot be resolved with the naked eye.

Viscosities

The viscosity has been measured with a Haake falling ball viscometer (type C) Thermo Fisher Scientific (Schwerte, Germany) according to ISO 12058 at different temperatures.

In order to measure the degree of shear thinning (Newton- or non-Newton behavior) if present, the viscosity was measured with a disc-rheometer Malvern Gemini according to DIN 53018 at different temperatures and shear rates.

Surface Tension

Static surface tension was measured at room temperature using a Krüss K-100 tensiometer (available from Kruss GmbH of Hamburg Germany) using the plate method. The applied norm is DIN 53914.

Particle Size Measurement

The particle sizes (diameter) were determined by laser 'Dynamic Light Scattering' with a Malvern Zetasizer ZS. The method is also known as photon correlation spectroscopy or quasi-elastic light scattering following ISO 13320-1 (see also http://en.wikipedia.org/wiki/Dynamic light_scattering).

The particle size measurement was conducted with a dispersion of the fillers b) or a dispersion of the non-swellable fillers f1) or with the entire photocurable coating composition after dilution with isopropanol.

The detailed measuring conditions are for example for a composition comprising 50 wt.-% filler b)+silane c) and diacrylate applying a dilution with isopropanol of up to 1:100 at 25° C. while kept dispersed with ultrasound. The wavelength used for scattering was 633 nm at measuring time of 1000 sec and a count rate 239.2 kcps, whereby the stray light was detected at an angle of 173° (back scattering). The viscosity of the sample and dispersant was 2.32 cP at 25° C., and the refractive index of sample was 1.52, the refractive index of the dispersant was 1.39.

EXAMPLES

Example 1 Effect of Different Matting Agents f2)

To the composition shown in table 1a 11.3 pt.wt of the varying component f2) (example 1.1-1.6) was added. The silica component b) (FCS 100) had a particle size according to Zetasizer of D50 of 12 nm ($D_{10}$ 8 nm; $D_{90}$ 33.2 nm-see FIG. 2 measured at a dilution of FCS100 with isopropanol 1:100). The achievable gloss values shown in table 1b are compared after different drying and curing conditions I) to III) as defined below. For accelerating the solution step of the components f2) they are dissolved with 9.1 pt.wt of the 1-methoxy-2-propanol. The formulation was mixed, heated to 60° C. After cooling down the formulation to room temperature a polycarbonate panel was coated and subjected to the three different drying and curing conditions I), II) and III). The matting level was measured and resulted in gloss values between 20 and 50 at 20° and 60° angles (EN ISO 2813).

The evaluation of matting in the examples 1.1 to 1.6 followed after 3 different drying and curing process steps.

Drying and Curing Steps I) to III):

I) Transparent polycarbonate panels dried with a convection oven for 2 min at 50-70° C. (Reference condition),
II) Transparent polycarbonate panels dried with a carbon medium wavelength IR-lamp, 60 sec and cured at 200-440 nm with a medium pressure mercury UV-lamp with an electrical power of 80-200 W/cm at a belt speed of 5 m/m in.
III) Transparent polycarbonate panels pre-dried obtained according to I), were precured with an 172 nm IOT Excimer UV-lamp (type Exirad 172, IOT Germany) at a belt speed of 10 m/min under inert gas atmosphere and thereafter cured at 200-440 nm with a medium pressure mercury UV-lamp with an electrical power of 80-200 W/cm at the same belt speed.

TABLE 1a

General composition for comparison of matting agents f2)

| | component | | [weight parts] |
|---|---|---|---|
| Methacrylsilane treated SiO2 | b) | FCS100)* | 2.2 |
| Hexandioldiacrylate | a) | XX in FCS100 | 2.2 |
| Poly C1-C4-alkylmethacrylates 1.1-1.6 f2) | | component f2) | 0.0 |
| Leveling additive | h) | Byk 310 | 0.2 |
| 1-Methoxy-2-propanol | g) | Dowanol PM | 9.1 |
| Methyl-isobutylketon | g) | MIBK | 100.0 |
| Urethane hexaacrylate | a) | Ebecryl 8301 | 51.3 |
| Light Stabilizer | d) | Tinuvin 123 | 0.8 |
| Photoinitiator I | e) | Irgacure 184 | 2.5 |
| Photoinitiator II | e) | Irgacure 819 | 0.2 |
| Resorcinol UV-Absorber | d) | SDBR | 15.6 |
| Triacrylate (TMPTA) | a) | TMPTA | 16.0 |
| | | Sum | 200 |
| | | Solids/% | 39.8 |

*wt.pt. $SiO_2$ + silane ($R^4$ refers to the alkyl residue at the ester moiety of the acrylate shown here for example for a methacrylate:

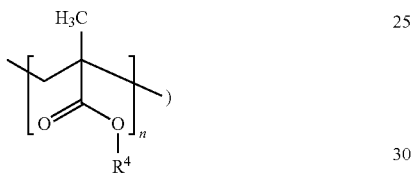

TABLE 1b

Effect of matting agents f2)

| examples 1.1-1.6 | | R4 | Mn [g/mol] | I)[2] gloss 20° | II)[2] gloss 20° | III)[2] gloss 20° | III)[3] gloss 60° | Scratch test III) |
|---|---|---|---|---|---|---|---|---|
| 1.1. | ELVACITE 4071 | C1-alkyl | 24.000 | 143 | 169 | 40 | 60.1 | 0 |
| 1.2. | ELVACITE 3000 | C1-alkyl | 39.000 | 147 | 164 | 101 | 118.7 | 0 |
| 1.3. | ELVACITE 2042 | C1-alkyl | 220.000 | 143 | 116 | 42 | 45.7 | 0 |
| 1.4 | Aldrich | C4-alkyl | 337.000 | 93 | 32 | 39 | 50.1 | 0 |
| 1.5. | Paraloid B67-100 | i-C4-alkyl | 70.000 | 124 | 43 | 42 | 48.0 | 0 |
| 1.6. | ELVACITE 2045 | i-C4-alkyl | 193.000 | 123 | 54 | 27 | 45.3 | 0 | averaged gloss value 20° of 3 measurements
[2]dried and cured as defined under I)-III)
[3]averaged gloss value 60° of 3 measurements
Substrate Polycarbonate (Makrolon AL2647, Bayer)

The results in table 1b show that with the photocurable coating composition in accordance with the invention low gloss levels are achieved, whereby the best results are observed for C4-alkylacrylates, in particular iso-C4-alkylacrylates.

Example 2

Table 2 shows the formulations tested, varying the amounts of component b), and/or component f2):

The variation of amount of component b) (2.1. to 2.3) shows the increase in scratch resistance with increasing amount of b). Also the matting effect increases.

The variation of component f2) (2.4 to 2.5) shows that the matting effect increases with increasing amount of f2).

The increase of b) and f2 (2.6 compared to 2.3) leads to an increase in matting effect at constant scratch resistance.

TABLE 2

| Brandname | Function | Example 2.1. wt. pt. | 2.2 wt. pt. | 2.3 wt. pt. | 2.4 wt. pt. | 2.5 wt. pt | 2.6 wt. pt. |
|---|---|---|---|---|---|---|---|
| FCS 100 (Momentive) | 50 wt. % acryl-functionalized $SiO_2$-nanoparticles in HDDA | 3.2 | 7.6 | 10.8 | 3.2 | 3.2 | 10.8 |
| Byk 310 (Byk Chemkie) | polyester modified polydimethylsiloxan | 0.1 | 0.1 | 0.1 | 0.1 | 0.1 | 0.1 |
| Desmolux U 400)* | aliphatic urethane hexaacrylate | 11.8 | 11.8 | 11.8 | 11.8 | 11.8 | 11.8 |
| CN 983 (Satomer) | aliphatic urethane diacrylate | 14.4 | 14.4 | 14.4 | 14.4 | 14.4 | 14.4 |
| TMPTA (Cytec) | aliphatic triacrylate | 13.0 | 13.0 | 13.0 | 13.0 | 13.0 | 13.0 |
| SR 341 Sartomer | aliphatic diacrylate | 10.7 | 10.7 | 10.7 | 10.7 | 10.7 | 10.7 |
| Tinuvin 292 (BASF) | HALS stabilizer | 0.6 | 0.6 | 0.6 | 0.6 | 0.6 | 0.6 |
| Irganox 184 (BASF) | photoinitiator I | 1.8 | 1.8 | 1.8 | 1.8 | 1.8 | 1.8 |
| Lucirin TPO (BASF) | photoinitiator II | 0.5 | 0.5 | 0.5 | 0.5 | 0.5 | 0.5 |
| SDBR (Momentive) | UV-absorber | 3.5 | 3.5 | 3.5 | 3.5 | 3.5 | 3.5 |
| Polyisobutylmethacrylate ($M_w$ 70,000) (Aldrich) | non-reactive acrylate | 6.7 | 6.7 | 6.7 | 3.4 | 10.1 | 10.1 |
| Solvent [1] | | 80 | 80 | 80 | 80 | 80 | 80 |
| Scratch Resistance [2] | | 2 | 1 | 1 | 2 | 3 | 2 |
| Scratch Resistance [3] | | 1 | 0 | 0 | 1 | 1 | 0 |
| Gloss [4] | | 37 | 32 | 34 | 55 | 25 | 27 |

[1] propyleneglycol monomethylether or methylisobutylketone
[2] Momentive steel wool test curing method II)
[3] Momentive steel wool test curing method III)
[4] according to DIN 67530 (ASTM D2457) after curing method III)
*Bayer Material Science

The invention claimed is:

1. A coating process for coating a substrate comprising the step of applying onto a surface of the substrate a photocurable coating composition comprising:
   a) at least one photocurable component,
   b) at least one filler having an average particle size of $D_{50}<0.5$ μm,
   c) optionally one or more silanes or siloxanes,
   d) at least one UV stabilizer,
   e) at least one photoinitiator,
   f) at least one swellable or soluble polymer selected from the group consisting of n-butyl-acrylate polymers, sec-butyl-acrylate polymers, isobutyl-acrylate polymers, tert-butyl-acrylate polymers, n-butyl-methacrylate polymers, sec-butyl-methacrylate polymers, isobutyl-methacrylate polymers, and tert-butyl-methacrylate polymers, and
   g) optionally one or more solvents,
   h) optionally one or more auxiliaries,
   wherein the cured coating composition has a gloss value according to ASTM D2457 at 60° of less than 60, and
   further comprising the curing steps of:
      (i) irradiating the coated substrate with UV-light of a wave length of less than 200 nm, and subsequently
      (ii) irradiating the coated substrate obtained in step (i) with UV-light of a wave length of 200 to 440 nm.

2. The coating process for coating a substrate according to claim 1, wherein the step of applying said photocurable composition is by a spray-coating process.

3. The coating process according to claim 1 wherein the step of applying said photocurable composition comprises the steps of:
   i) providing a substrate,
   ii) optionally forming a decor, a pattern or an image onto said substrate,
   iii) spraying the composition onto the surface of said decor, pattern or image, and
   iv) optionally drying the coated surface.

4. The coating process according to claim 3, wherein step ii) is performed, and the formation of the decor, the pattern or the image of step ii) and the spraying of the composition of step (iii) are carried out by an ink-jet printing process.

5. Coated articles comprising a transparent topcoat obtained by the coating process of claim 1.

6. Coated articles according to claim 5, having a multi-layer coating comprising:
   a) the substrate,
   b) optionally at least one primer layer on said substrate,
   c) a coloured or decorative layer, and
   d) the transparent topcoat layer.

7. Coated articles according to claim 5 selected from decorative elements, signs, stickers, automotive parts, eye-glasses, eyeglass frames, writing utensils, displays, flexible films and sheets, rigid films and sheets and keypads.

* * * * *